US012567230B2

(12) United States Patent
Huang et al.

(10) Patent No.: US 12,567,230 B2
(45) Date of Patent: Mar. 3, 2026

(54) IMAGE ENHANCEMENT METHOD, DEVICE, AND COMPUTER PROGRAM

(71) Applicant: UNILUMIN GROUP CO., LTD, Shenzhen (CN)

(72) Inventors: Bin Huang, Shenzhen (CN); Yongjie Li, Shenzhen (CN); Lingxiang Shen, Shenzhen (CN)

(73) Assignee: UNILUMIN GROUP CO., LTD, Shenzhen (CN)

( * ) Notice: Subject to any disclaimer, the term of this patent is extended or adjusted under 35 U.S.C. 154(b) by 293 days.

(21) Appl. No.: 18/412,379

(22) Filed: Jan. 12, 2024

(65) Prior Publication Data

US 2024/0161452 A1 May 16, 2024

Related U.S. Application Data

(63) Continuation of application No. PCT/CN2022/101173, filed on Jun. 24, 2022.

(30) Foreign Application Priority Data

Jul. 13, 2021 (CN) ......................... 202110791702.6

(51) Int. Cl.
*G06V 10/60* (2022.01)
*G06T 3/4007* (2024.01)
(Continued)

(52) U.S. Cl.
CPC ............ *G06V 10/60* (2022.01); *G06T 3/4007* (2013.01); *G06T 5/92* (2024.01); *G06T 11/60* (2013.01); *G06V 10/56* (2022.01); *H04N 1/60* (2013.01)

(58) Field of Classification Search
CPC .......... G06V 10/60; G06V 10/56; G06T 5/92; G06T 3/4007; G06T 11/60; H04N 1/60
See application file for complete search history.

(56) References Cited

U.S. PATENT DOCUMENTS

2013/0063474 A1 3/2013 Chen
2013/0120607 A1* 5/2013 Manabe .................. H04N 9/76 348/222.1
2014/0064632 A1* 3/2014 Manabe ............... H04N 23/951 382/254

FOREIGN PATENT DOCUMENTS

AU 2005202791 A1 2/2006
CN 101523480 A 9/2009
(Continued)

OTHER PUBLICATIONS

Akyuz et al., Do HDR Displays Support LDR Content? A Psychophysical Evaluation, ACM Transactions on Graphics, vol. 26, No. 3, pp. 2-7, dated Jul. 29, 2007.
(Continued)

*Primary Examiner* — Ming Shui
(74) *Attorney, Agent, or Firm* — Westbridge IP LLC

(57) ABSTRACT

Disclosed is an image enhancement method, including: obtaining an image adjustment parameter; converting first image data to be processed into second image data; adjusting the luminance data to obtain adjusted luminance data, updating the luminance adjustment parameter when that the adjusted luminance data does not meet a preset luminance enhancement condition, and based on an updated luminance adjustment parameter, continuing to adjust the adjusted luminance data until final adjusted luminance data meets the luminance enhancement condition; adjusting the chroma data to obtain adjusted chroma data, updating the chroma adjustment parameter when that the adjusted chroma data does not meet a preset chroma enhancement condition, and based on an updated chroma adjustment parameter, continuing to adjust the adjusted chroma data until final adjusted chroma data meets the chroma enhancement condition; and performing image color dimension conversion on the luminance data and the chroma data to obtain third image data.

17 Claims, 8 Drawing Sheets

(51) Int. Cl.

| | |
|---|---|
| ***G06T 5/92*** | (2024.01) |
| ***G06T 11/60*** | (2006.01) |
| ***G06V 10/56*** | (2022.01) |
| ***H04N 1/60*** | (2006.01) |

(56) References Cited

FOREIGN PATENT DOCUMENTS

| | | | |
|---|---|---|---|
| CN | 101589418 | A | 11/2009 |
| CN | 102306378 | A | 1/2012 |
| CN | 102779330 | A | 11/2012 |
| CN | 104584113 | A | 4/2015 |
| CN | 105205792 | A | 12/2015 |
| CN | 105869582 | A | 8/2016 |
| CN | 107111980 | A | 8/2017 |
| CN | 108711142 | A | 10/2018 |
| CN | 109658341 | A | 4/2019 |
| CN | 111899182 | A | 11/2020 |
| CN | 112330564 | A | 2/2021 |
| CN | 113066020 | A | 7/2021 |
| CN | 113643651 | A | 11/2021 |
| EP | 2056284 | A1 | 5/2009 |
| EP | 2339533 | A1 | 6/2011 |
| KR | 102261532 | B1 | 6/2021 |

OTHER PUBLICATIONS

Duan et al., New segmentation-based tone mapping algorithm for high dynamic range image, Proceedings of SPIE, vol. 10420, pp. 1-6, dated Jul. 21, 2017.

Extended European Search Report issued in counterpart European Patent Application No. 22841167.4, dated Jun. 20, 2025.

First Office Action issued in counterpart Chinese Patent Application No. 202110791702.6, dated Mar. 31, 2022.

International Search Report and Written Opinion issued in corresponding PCT Application No. PCT/CN2022/101173, dated Aug. 30, 2022.

Notification to Grant Patent Right for Invention issued in counterpart Chinese Patent Application No. 202110791702.6, dated May 20, 2022.

* cited by examiner

S202 obtaining an image adjustment parameter. The image adjustment parameter includes a luminance adjustment parameter and a chroma adjustment parameter

S204 converting the first image data to be processed into second image data. The first image data and the second image data belong to different color dimensions, and the second image data includes luminance data and chroma data

S206 adjusting the luminance data based on the luminance adjustment parameter to obtain adjusted luminance data. When the adjusted luminance data does not meet the preset luminance enhancement condition, the luminance adjustment parameter is updated, and the adjusted luminance data continues to be adjusted based on the updated luminance adjustment parameter until the final adjusted luminance data meets the luminance enhancement condition

S208 adjusting the chroma data based on the chroma adjustment parameter to obtain adjusted chroma data. When the adjusted chroma data does not meet the preset chroma enhancement conditions, the chroma adjustment parameter is updated, and the adjusted chroma data continues to be adjusted based on the updated chroma adjustment parameter until the final adjusted chroma data meets the chroma enhancement conditions

S210 performing image color dimension conversion on the luminance data that meets the luminance enhancement condition and the chroma data that meets the chroma enhancement condition, to obtain third image data with the same color dimension as the first image data, and using the third image data as the result of performing image enhancement processing on the first image data

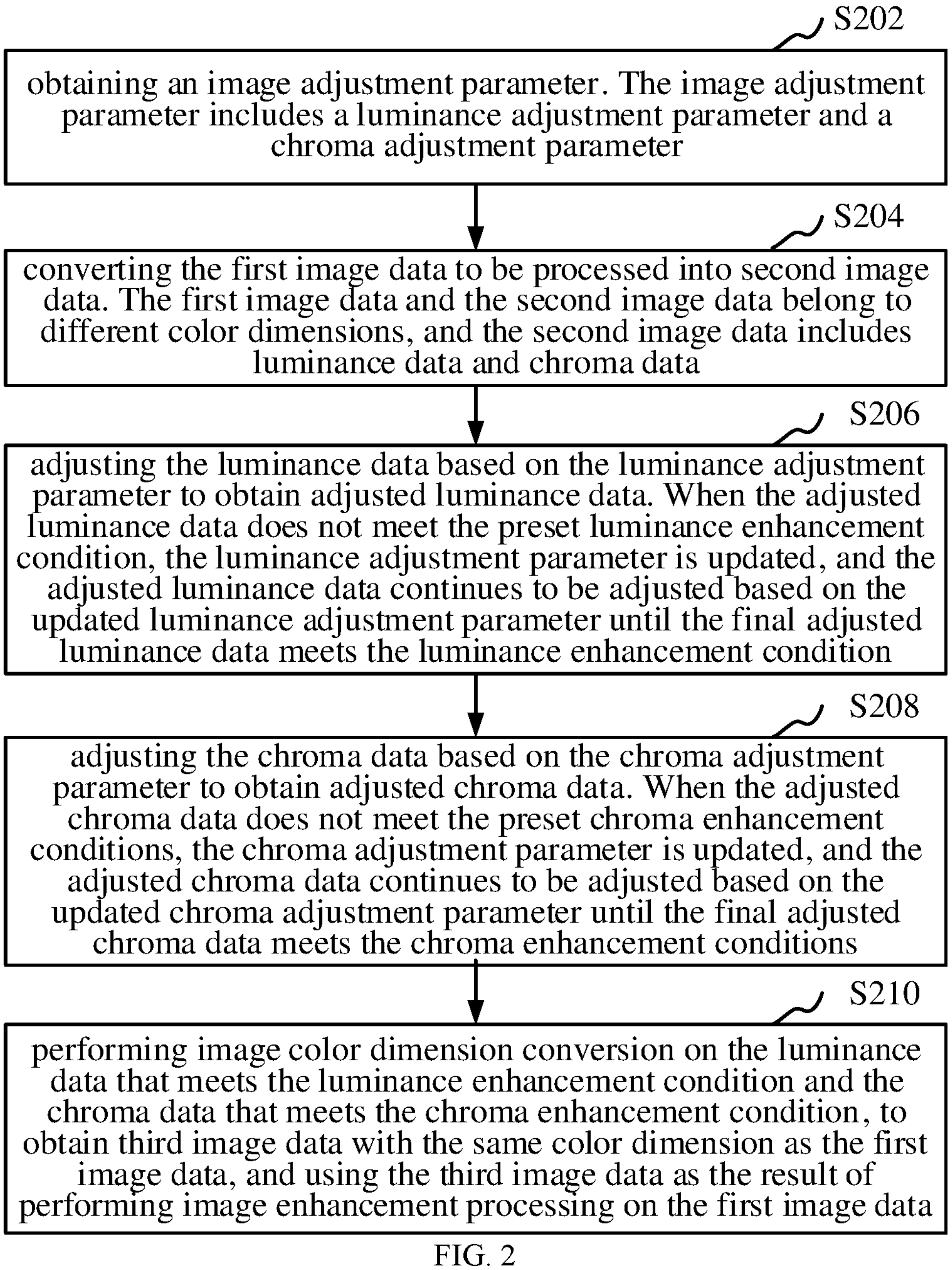

FIG. 2

IMAGE ENHANCEMENT METHOD, DEVICE, AND COMPUTER PROGRAM

CROSS-REFERENCE TO RELATED APPLICATIONS

This application is a continuation application of International Application No. PCT/CN2022/101173, filed on Jun. 24, 2022, which claims priority to Chinese Patent Application No. 202110791702.6, filed on Jul. 13, 2021. The disclosures of the above-mentioned applications are incorporated herein by reference in their entireties.

TECHNICAL FIELD

The present application relates to the technical field of image processing, and in particular to an image enhancement method, an image enhancement device, a computer equipment and a storage medium.

BACKGROUND

With the development of light emitting diode (LED) displays, the size of the LED display has become smaller and smaller, and many outdoor screens can also be used indoors. In multiple usage scenarios, the LED display may be used both indoors and outdoors, which means that one screen is used for dual purposes or even one screen is used for multiple purposes. However, due to the external light environment, the luminance of the indoor LED display is different from the luminance of the outdoor LED display. If only linearly adjusting the RGB lamp bead current of the LED display to adjust the luminance of the lamp bead, the colors displayed on the LED display will be offset, and the display effect will be greatly reduced. In this case, the display color of the LED display needs to be adjusted.

luminance is one display characteristic of the LED display, and luminance control and image luminance processing are crucial. When darker images and overly bright images are displayed on the LED display, the luminance information is obvious. Based on this, RGB is usually converted to YCrCb to process the luminance component Y in the conventional solution. However, the image obtained by processing in this way has a poor color display effect.

SUMMARY

Embodiments of the present application provide an image enhancement method, an image enhancement device, a computer equipment, and a storage medium.

In a first aspect, the present application provides an image enhancement method executed by a computer equipment. The method includes:

obtaining an image adjustment parameter, the image adjustment parameter including a luminance adjustment parameter and a chroma adjustment parameter;

converting first image data to be processed into second image data, the first image data and the second image data belonging to different color dimensions, and the second image data including luminance data and chroma data;

adjusting the luminance data based on the luminance adjustment parameter to obtain adjusted luminance data, determining whether the adjusted luminance data meets a preset luminance enhancement condition, updating the luminance adjustment parameter when that the adjusted luminance data does not meet the preset luminance enhancement condition, and based on an updated luminance adjustment parameter, continuing to adjust the adjusted luminance data until final adjusted luminance data meets the luminance enhancement condition;

adjusting the chroma data based on the chroma adjustment parameter to obtain adjusted chroma data, determining whether the adjusted chroma data meets a preset chroma enhancement condition, updating the chroma adjustment parameter when that the adjusted chroma data does not meet the preset chroma enhancement condition, and based on an updated chroma adjustment parameter, continuing to adjust the adjusted chroma data until final adjusted chroma data meets the chroma enhancement condition; and performing image color dimension conversion on the luminance data that meets the luminance enhancement condition and the chroma data that meets the chroma enhancement condition, to obtain third image data belonging to a same color dimension as the first image data, thereby generating the third image data after image-enhanced from the first image data.

The adjusting the luminance data based on the luminance adjustment parameter to obtain the adjusted luminance data includes:

making statistics on luminance data before adjustment based on the luminance adjustment parameter, and determining a scaling coefficient based on a statistical result and maximum required luminance of the luminance adjustment parameter, the statistical result including a minimum luminance value, a maximum luminance value and an initial average luminance value of the luminance data before adjustment;

performing luminance linear scaling processing on the luminance data of the second image data to obtain luminance data after luminance linear scaling processing according to the scaling coefficient, and determining a scaling average luminance value based on the luminance data after luminance linear scaling processing;

determining at least one target interval to be performed luminance adjustment of the second image data according to the scaling average luminance value;

determining an adaptive luminance adjustment manner matching the second image data; and adjusting the luminance data in the at least one target interval to obtain the adjusted luminance data based on a matched adaptive luminance adjustment manner.

In some embodiments, the determining at least one target interval to be performed luminance adjustment of the second image data according to the scaling average luminance value includes:

dividing the luminance data after luminance linear scaling processing into a first luminance data set and a second luminance data set based on the scaling average luminance value;

filtering out a first target luminance value with a highest occurrence frequency from the first luminance data set, and filtering out a second target luminance value with a highest occurrence frequency from the second luminance data set; and determining a target interval corresponding to luminance data to be performed luminance adjustment according to frequency values respectively corresponding to the first target luminance value and the second target luminance value.

In some embodiments, the determining the target interval corresponding to the luminance data to be performed luminance adjustment according to the frequency values respectively corresponding to the first target luminance value and the second target luminance value includes:

determining a first luminance frequency of the first target luminance value in the first luminance data set;

determining a second luminance frequency of the second target luminance value in the second luminance data set;

obtaining a first luminance data adjustment interval based on the first luminance frequency, the first target luminance value being within the first luminance data adjustment interval;

obtaining a second luminance data adjustment interval based on the second luminance frequency, the second target luminance value being within the second luminance data adjustment interval; and using the first luminance data adjustment interval and the second luminance data adjustment interval as target intervals to be performed luminance adjustment of the second image data.

In some embodiments, the obtaining the first luminance data adjustment interval based on the first luminance frequency includes:

determining a luminance value corresponding to a middle frequency of a left side of a dark area and a luminance value corresponding to a middle frequency of a right side of the dark area according to the first luminance frequency, the middle frequency of the dark area being half of the first luminance frequency; and determining a first luminance data adjustment area from the first luminance data set according to the luminance value corresponding to the middle frequency of the left side of the dark area and the luminance value corresponding to the middle frequency of the right side of the dark area.

In some embodiments, the obtaining the second luminance data adjustment interval based on the second luminance frequency includes:

determining a luminance value corresponding to a middle frequency of a left side of a bright area and a luminance value corresponding to a middle frequency of a right side of the bright area according to the second luminance frequency, the middle frequency of the bright area being half of the second luminance frequency; and determining a second luminance data adjustment area from the second luminance data set according to the luminance value corresponding to the middle frequency of the left side of the bright area and the luminance value corresponding to the middle frequency of the right side of the bright area.

In some embodiments, the luminance adjustment parameter includes the maximum required luminance, and determining the adaptive luminance adjustment manner matching the second image data includes:

multiplying the maximum required luminance by a first weight to obtain a first luminance threshold, and multiplying the maximum required luminance by a second weight to obtain a second luminance threshold, the first weight being smaller than the second weight; and determining the adaptive luminance adjustment manner matching the second image data from a preset luminance adjustment manner according to the scaling average luminance value, the first target luminance value, the second target luminance value, the first luminance threshold and the second luminance threshold.

In some embodiments, the adaptive luminance adjustment manner includes a gamma adjustment formula corresponding to the luminance data, and the method further includes:

calculating a normalized gamma value corresponding to each grayscale level based on a grayscale level of the first image data, and obtaining a gamma value mapping table corresponding to each grayscale level based the normalized gamma value corresponding to each grayscale level;

using the luminance data and a gamma coefficient as variables to perform a bilinear interpolation calculation to obtain a first interpolation coefficient based on a variable representation, and using a difference value between a value one and a first interpolation coefficient as a second interpolation coefficient;

mapping a luminance data variable to a grayscale space, determining a third interpolation coefficient based on a mapped luminance data variable, and using a difference value between the value one and the third interpolation coefficient as a fourth interpolation coefficient;

determining a gamma approximate adjustment coefficient corresponding to the luminance data based on the first interpolation coefficient, the second interpolation coefficient, the third interpolation coefficient, the fourth interpolation coefficient, and the gamma value mapping table corresponding to each grayscale level; and determining a gamma adjustment formula corresponding to the luminance data according to the gamma approximate adjustment coefficient and the maximum luminance.

In some embodiments, the chroma adjustment parameter includes a hue rotation angle, a saturation adjustment coefficient and a chroma compensation table, and the adjusting the chroma data based on the chroma adjustment parameter to obtain the adjusted chroma data includes:

making statistics on luminance data before adjustment based on the luminance adjustment parameter, determining a scaling coefficient based on a statistical result and maximum required luminance of the luminance adjustment parameter, the statistical result including a minimum luminance value, a maximum luminance value and an initial average luminance value of the luminance data before adjustment;

performing a two-dimensional rotation on the chroma data according to the hue rotation angle to obtain first chroma data;

converting the first chroma data according to the saturation adjustment coefficient and the scaling coefficient to obtain second chroma data; and performing a chroma compensation on the second chroma data to obtain third chroma data according to the chroma compensation table, and using the third chroma data as adjusted chroma data.

In a second aspect, the present application provides an image enhancement device including:

an acquisition module configured to acquire an image adjustment parameter, the image adjustment parameter including a luminance adjustment parameter and a chroma adjustment parameter;

a first conversion module, the first conversion module being configured to convert first image data to second image data, the first image data and the second image data belonging to different color dimensions, and the second image data including luminance data and chroma data;

a first adjustment module, the first adjustment module being configured to adjust the luminance data based on the luminance adjustment parameter to obtain adjusted luminance data, determine whether the adjusted luminance data meets a preset luminance enhancement condition, update the luminance adjustment parameter when that the adjusted luminance data does not meet the preset luminance enhancement condition, and continue to adjust the adjusted luminance data based on the updated luminance adjustment parameter until the final adjusted luminance data meets the luminance enhancement condition;

a second adjustment module, the second adjustment module being configured to adjust the chroma data based on the chroma adjustment parameter to obtain adjusted chroma data, determine whether the adjusted chroma data meets a preset chroma enhancement condition, update the chroma adjustment parameter when that the adjusted chroma data does not meet the preset chroma enhancement condition, and continue to adjust the adjusted chroma data based on the updated chroma adjustment parameter until the final adjusted chroma data meets the chroma enhancement condition; and a second conversion module, the second conversion module being configured to perform image color dimension conversion on the luminance data that meets the luminance enhancement condition and the chroma data that meets the chroma enhancement condition to obtain a third image data belonging to a same color dimension as the first image data, and use the third image data as a result of performing image enhancement processing on the first image data.

The first adjustment module is further configured to: make statistics on luminance data before adjustment based on the luminance adjustment parameter, and determine a scaling coefficient based on a statistical result and maximum required luminance of the luminance adjustment parameter, the statistical result including a minimum luminance value, a maximum luminance value and an initial average luminance value of the luminance data before adjustment; perform luminance linear scaling processing on the luminance data of the second image data to obtain luminance data after luminance linear scaling processing according to the scaling coefficient, and determine a scaling average luminance value based on the luminance data after luminance linear scaling processing; determine at least one target interval to be performed luminance adjustment of the second image data according to the scaling average luminance value; determine an adaptive luminance adjustment manner matching the second image data; and adjust the luminance data in the at least one target interval to obtain the adjusted luminance data based on a matched adaptive luminance adjustment manner.

In some embodiments, the first adjustment module is further configured to: divide the luminance data after luminance linear scaling processing into a first luminance data set and a second luminance data set based on the scaling average luminance value; filter out a first target luminance value with a highest occurrence frequency from the first luminance data set, and filter out a second target luminance value with a highest occurrence frequency from the second luminance data set; and determine a target interval corresponding to luminance data to be performed luminance adjustment according to frequency values respectively corresponding to the first target luminance value and the second target luminance value.

In some embodiments, the first adjustment module is further configured to: determine a first luminance frequency of the first target luminance value in the first luminance data set, and determine a second luminance frequency of the second target luminance value in the second luminance data set; obtain a first luminance data adjustment interval based on the first luminance frequency, the first target luminance value being within the first luminance data adjustment interval; obtain a second luminance data adjustment interval based on the second luminance frequency, the second target luminance value being within the second luminance data adjustment interval; and use the first luminance data adjustment interval and the second luminance data adjustment interval as target intervals to be performed luminance adjustment of the second image data.

In some embodiments, the first adjustment module is further configured to: determine a luminance value corresponding to a middle frequency of a left side of a dark area and a luminance value corresponding to a middle frequency of a right side of the dark area according to the first luminance frequency, the middle frequency of the dark area being half of the first luminance frequency; and determine a first luminance data adjustment area from the first luminance data set according to the luminance value corresponding to the middle frequency of the left side of the dark area and the luminance value corresponding to the middle frequency of the right side of the dark area.

In some embodiments, the first adjustment module is further configured to: determine a luminance value corresponding to a middle frequency of a left side of a bright area and a luminance value corresponding to a middle frequency of a right side of the bright area according to the second luminance frequency, the middle frequency of the bright area being half of the second luminance frequency; and determine a second luminance data adjustment area from the second luminance data set according to the luminance value corresponding to the middle frequency of the left side of the bright area and the luminance value corresponding to the middle frequency of the right side of the bright area.

In some embodiments, the first adjustment module is further configured to: multiply the maximum required luminance by a first weight to obtain a first luminance threshold, and multiply the maximum required luminance by a second weight to obtain a second luminance threshold, the first weight being smaller than the second weight; and determine the adaptive luminance adjustment manner matching the second image data from a preset luminance adjustment manner according to the scaling average luminance value, the first target luminance value, the second target luminance value, the first luminance threshold and the second luminance threshold.

In some embodiments, the adaptive luminance adjustment manner includes a gamma adjustment formula corresponding to the luminance data, the device further includes a mapping module, and the mapping module is configured to: calculate a normalized gamma value corresponding to each grayscale level based on a grayscale level of the first image data, and obtain a gamma value mapping table corresponding to each grayscale level based the normalized gamma value corresponding to each grayscale level; use the luminance data and a gamma coefficient as variables to perform a bilinear interpolation calculation to obtain a first interpolation coefficient based on a variable representation, and use a difference value between a value one and a first interpolation coefficient as a second interpolation coefficient; map a luminance data variable to a grayscale space, determine a third interpolation coefficient based on a mapped luminance data variable, and use a difference value between the value one and the third interpolation coefficient as a fourth interpolation coefficient; determine a gamma approximate adjustment coefficient corresponding to the luminance data based on the first interpolation coefficient, the second interpolation coefficient, the third interpolation coefficient, the fourth interpolation coefficient, and the gamma value mapping table corresponding to each grayscale level; and determine a gamma adjustment formula corresponding to the luminance data according to the gamma approximate adjustment coefficient and the maximum luminance.

In some embodiments, the chroma adjustment parameter includes a hue rotation angle, a saturation adjustment coefficient and a chroma compensation table, and the second adjustment module is further configured to: make statistics on luminance data before adjustment based on the luminance adjustment parameter, determine a scaling coefficient based on a statistical result and maximum required luminance of the luminance adjustment parameter, the statistical result including a minimum luminance value, a maximum luminance value and an initial average luminance value of the luminance data before adjustment; perform a two-dimensional rotation on the chroma data according to the hue rotation angle to obtain first chroma data; convert the first chroma data according to the saturation adjustment coefficient and the scaling coefficient to obtain second chroma data; and perform a chroma compensation on the second chroma data to obtain third chroma data according to the chroma compensation table, and use the third chroma data as adjusted chroma data.

In a third aspect, the present application provides a computer equipment including a memory and a processor. The memory stores a computer program, and when the computer program is executed by the processor, the following steps are implemented:

- obtaining an image adjustment parameter, the image adjustment parameter including a luminance adjustment parameter and a chroma adjustment parameter;
- converting first image data to be processed into second image data, the first image data and the second image data belonging to different color dimensions, and the second image data including luminance data and chroma data;
- adjusting the luminance data based on the luminance adjustment parameter to obtain adjusted luminance data, determining whether the adjusted luminance data meets a preset luminance enhancement condition, updating the luminance adjustment parameter when that the adjusted luminance data does not meet the preset luminance enhancement condition, and based on an updated luminance adjustment parameter, continuing to adjust the adjusted luminance data until final adjusted luminance data meets the luminance enhancement condition;
- adjusting the chroma data based on the chroma adjustment parameter to obtain adjusted chroma data, determining whether the adjusted chroma data meets a preset chroma enhancement condition, updating the chroma adjustment parameter when that the adjusted chroma data does not meet the preset chroma enhancement condition, and based on an updated chroma adjustment parameter, continuing to adjust the adjusted chroma data until final adjusted chroma data meets the chroma enhancement condition; and
- performing image color dimension conversion on the luminance data that meets the luminance enhancement condition and the chroma data that meets the chroma enhancement condition, to obtain third image data belonging to a same color dimension as the first image data, thereby generating the third chroma data after image-enhanced from the first image data.

In a fourth aspect, the present application provides a computer-readable storage medium storing a computer program. When the computer program is executed by a processor, the following steps are implemented:

- obtaining an image adjustment parameter, the image adjustment parameter including a luminance adjustment parameter and a chroma adjustment parameter;
- converting first image data to be processed into second image data, the first image data and the second image data belonging to different color dimensions, and the second image data including luminance data and chroma data;
- adjusting the luminance data based on the luminance adjustment parameter to obtain adjusted luminance data, determining whether the adjusted luminance data meets a preset luminance enhancement condition, updating the luminance adjustment parameter when that the adjusted luminance data does not meet the preset luminance enhancement condition, and based on an updated luminance adjustment parameter, continuing to adjust the adjusted luminance data until final adjusted luminance data meets the luminance enhancement condition;
- adjusting the chroma data based on the chroma adjustment parameter to obtain adjusted chroma data, determining whether the adjusted chroma data meets a preset chroma enhancement condition, updating the chroma adjustment parameter when that the adjusted chroma data does not meet the preset chroma enhancement condition, and based on an updated chroma adjustment parameter, continuing to adjust the adjusted chroma data until final adjusted chroma data meets the chroma enhancement condition; and
- performing image color dimension conversion on the luminance data that meets the luminance enhancement condition and the chroma data that meets the chroma enhancement condition, to obtain third image data belonging to a same color dimension as the first image data, thereby generating the third chroma data after image-enhanced from the first image data.

In a fifth aspect, the present application provides a computer program including a program instruction. When executed on a computer equipment, the computer program causes the computer equipment to implement the method as mentioned above.

The details of one or more embodiments of the present application are illustrated in the accompanying drawings and the description below. Other features, objectives and advantages of the present application will become apparent from the description, drawings and claims.

BRIEF DESCRIPTION OF THE DRAWINGS

One or more of the accompanying drawings may be referred to better describe and illustrate those embodiments and/or examples disclosed herein. The additional details or examples used to describe the accompanying drawings should not be deemed as a limitation to the scope of any of the present application, the described embodiments and/or examples, and the best mode currently understood in the present application.

FIG. 2 is a schematic flowchart of the image enhancement method according to some embodiments.

DETAILED DESCRIPTION OF THE EMBODIMENTS

In order to make the purpose, technical solutions and advantages of the present application more clear, the present application will be further described in detail below with reference to the drawings and embodiments. It should be understood that the specific embodiments described here are only used to explain the present application and are not intended to limit the present application.

Figure 1:
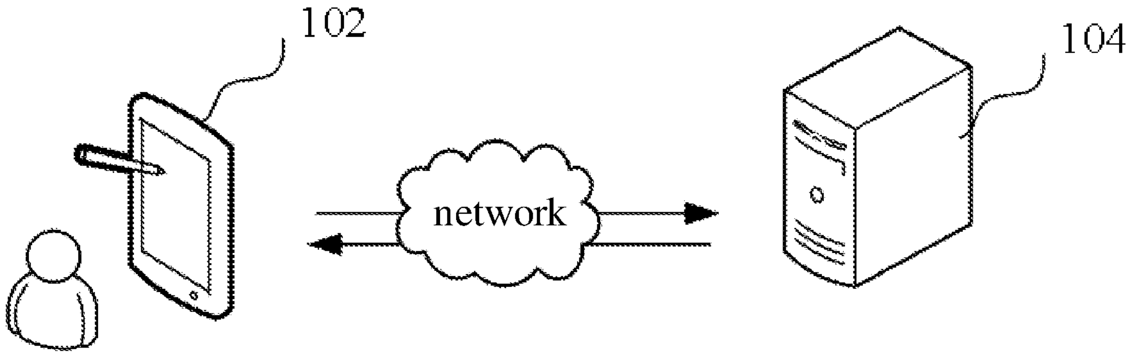
FIG. 1 is an application environment diagram of an image enhancement method according to some embodiments.

The image enhancement method of the present application can be applied in the application environment as shown in FIG. 1. The terminal 102 communicates with the server 104 through the network. The terminal 102 and the server 104 can be used individually to execute the image enhancement method of the present application, and the terminal 102 and the server 104 can be used in cooperation to execute the image enhancement method of the present application. Taking the terminal 102 and the server 104 used in cooperation to execute the image enhancement method of the present application as an example, when performing the image enhancement process, the computer equipment first obtains the luminance adjustment parameter and the chroma adjustment parameter used to adjust the image. Then the computer equipment obtains the first image data to be processed and convert the first image data into the second image data. The second image data includes luminance data and chroma data, and the first image data and the second image data belong to different color dimensions. Then based on the luminance adjustment parameter, the luminance data is adjusted until the adjusted luminance data meets the preset luminance condition. The chroma data is adjusted based on the chroma adjustment parameter until the adjusted chroma data meets the preset chroma condition. Finally, image color dimension conversion is performed on the luminance data that meets the luminance enhancement condition and the chroma data that meets the chroma enhancement condition, to obtain the third image data with the same color dimension as the first image data, and then the third image data is returned to the terminal 102.

The terminals 102 can be, but is not limited to, various personal computers, laptops, smart phones, tablets, and portable wearable equipments. The server 104 can be an independent server or a server cluster composed of multiple servers.

Before describing the image enhancement method of the present application, some terms related in the embodiments of the present application are first explained as follows. The image adjustment parameter is a parameter used to process the converted image data, and a certain parameter value is generally preset and can be changed according to requirements. The image data is the data information in an image corresponding to one color dimension, and different color dimensions corresponds to different image data. The scaling coefficient is calculated based on the image data statistical result, and is used for linear processing on the image data. The target interval is the luminance data interval obtained based on the image data statistical result, and the luminance data of the luminance data value within the target interval needs to be adjusted.

In some embodiments, as shown in FIG. 2, an image enhancement method is provided. Taking this method applied to a computer equipment (the computer equipment can specifically be a terminal or a server in FIG. 1) as an example for description, which includes the following steps.

Step S202, obtaining an image adjustment parameter. The image adjustment parameter includes a luminance adjustment parameter and a chroma adjustment parameter.

In an embodiment, before the computer equipment adjusts specific image data, the adjustment parameter should first be obtained. The parameter value of the adjustment parameter can be set in advance. When the adjustment effect is not good, the adjustment parameter can be further adjusted and updated to obtain a new adjustment parameter, and the new adjustment parameter can be used to adjust the specific image data again.

Step S204, converting the first image data to be processed into second image data. The first image data and the second image data belong to different color dimensions, and the second image data includes luminance data and chroma data.

In an embodiment, after receiving the first image data that needs to be converted, the computer equipment converts the first image data into the second image data according to the image processing operation to be performed. Generally speaking, the first image data and the second image data belong to different color dimensions. In this embodiment, the second image data includes luminance data and chroma data. In a specific embodiment, the first image data belongs to the RGB color dimension, and the second image data belongs to the YCrCb color dimension. Y is the luminance data and CrCb is the chroma data.

Step S206, adjusting the luminance data based on the luminance adjustment parameter to obtain adjusted luminance data. When the adjusted luminance data does not meet the preset luminance enhancement condition, the luminance adjustment parameter is updated, and the adjusted luminance data continues to be adjusted based on the updated luminance adjustment parameter until the final adjusted luminance data meets the luminance enhancement condition.

In an embodiment, after the computer equipment converts the first image, the corresponding luminance data can be obtained, and the luminance data is further processed based on the luminance adjustment parameter of the aforementioned image adjustment parameter, then the processing result will be determined. After that, it is determined whether the adjusted luminance data meets the preset luminance enhancement condition. If the adjusted luminance data does not meet the preset luminance enhancement condition, the luminance adjustment parameter will be updated and adjusted, and then based on the adjusted luminance adjustment parameter, the adjusted luminance data is adjusted again until the final adjusted luminance data meets the preset luminance enhancement conditions. The preset luminance enhancement conditions can be changed according to the adjustment requirements of the first image data, such as brightening a darker image or darkening a brighter image, or balancing the luminance of images with different luminance, and the like, which is not specific limited in this embodiment.

Step S208, adjusting the chroma data based on the chroma adjustment parameter to obtain adjusted chroma data. When the adjusted chroma data does not meet the preset chroma enhancement conditions, the chroma adjustment parameter is updated, and the adjusted chroma data continues to be adjusted based on the updated chroma adjustment parameter until the final adjusted chroma data meets the chroma enhancement conditions.

In an embodiment, after obtaining the corresponding chroma data, the computer equipment needs to further process the chroma data based on the chroma adjustment parameter in the aforementioned image adjustment parameter, and the processing result will be determined. After that, it is determined whether the adjusted chroma data meets the preset chroma enhancement conditions. If the adjusted chroma data does not meet the preset chroma enhancement conditions, the chroma adjustment parameter will be adjusted, and the adjusted chroma data will be adjusted again based on the adjusted chroma adjustment parameter until the final adjusted chroma data can meet the preset chroma enhancement conditions. The preset chroma enhancement condition can be changed according to the adjustment requirements of the first image data, for example, a dark image can be adjusted to a bright color, which is not limited in this embodiment.

Step S210, performing image color dimension conversion on the luminance data that meets the luminance enhancement condition and the chroma data that meets the chroma enhancement condition, to obtain third image data with the same color dimension as the first image data, thereby generating the third chroma data after image-enhanced from the first image data.

In an embodiment, after processing the luminance data and chroma data respectively, the computer equipment needs to correspondingly convert the processed luminance data and the processed chroma data into the third image data in the same format as the first image data. The third image data is the result of performing image enhancement processing on the first image data.

In the above image enhancement method, the luminance adjustment parameter and the chroma adjustment parameter used to adjust the image are first obtained. The first image data to be processed is converted into the second image data, and the second image data includes luminance data and chroma data. The first image data and the second image data belong to different color dimensions. Then the luminance data is adjusted based on the luminance adjustment parameter until the adjusted luminance data meets the preset luminance enhancement conditions. Based on the chroma adjustment parameter, the chroma data is adjusted until the adjusted chroma data meets the preset chroma enhancement conditions. Finally, the image color dimension conversion is performed on the luminance data that meets the luminance enhancement conditions and the chroma data that meets the chroma enhancement conditions, and then the third image data with the same color dimension as the first image data can be obtained, to obtain the result of performing image enhancement processing on the first image data. In the above scheme, after the first image data is converted into the second image data, parameter adjustment is performed on the luminance data and the chroma data respectively, and then the adjusted luminance data and the adjusted chroma data are converted into the third image data with the same data color dimension as the first image data, which effectively overcomes the problem of poor color display of the processed image after the first image data is converted into the second image data, so that the obtained third image data can still maintain a better color display effect after the luminance processing.

In an embodiment, the adjusting luminance data based on the luminance adjustment parameter to obtain adjusted luminance data includes: making statistics on the luminance data based on the luminance adjustment parameter, and determining a scaling coefficient based on a statistical result and maximum required luminance of the luminance adjustment parameter. the statistical result includes a minimum luminance value, a maximum luminance value and an initial average luminance value of the luminance data; performing luminance linear scaling processing on the luminance data of the second image data to obtain luminance data after luminance linear scaling processing according to the scaling coefficient, and determining a scaling average luminance value based on the luminance data after luminance linear scaling processing; determining at least one target interval to be performed luminance adjustment of the second image data according to the scaling average luminance value; determining an adaptive luminance adjustment manner matching the second image data; and adjusting the luminance data in the at least one target interval to obtain the adjusted luminance data based on a matched adaptive luminance adjustment manner.

Figure 5:
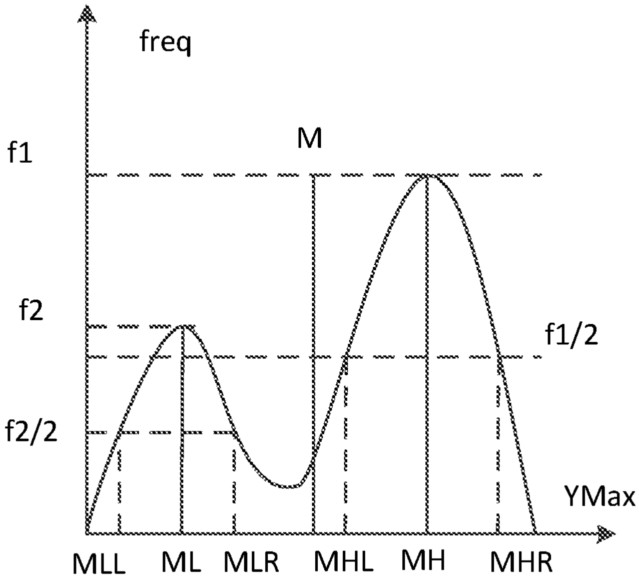
FIG. 5 is a luminance statistical diagram of the image enhancement method according to some embodiments.

In an embodiment, before the computer equipment performs specific adjustments on the luminance data, it first needs to make statistics on the luminance data in the initial state to determine the occurrence frequency of each luminance value, thus the corresponding luminance data statistics table can be determined, as shown in FIG. 5, in which the ordinate is frequency. Based on this statistical result, the computer equipment further determines the minimum luminance value, the maximum luminance value, and the initial average luminance value of the luminance data, and can calculate the corresponding scaling coefficient based on the minimum luminance value, the maximum luminance value, and the initial average luminance value as mentioned above. Based on this scaling coefficient, the computer equipment can linearly scale each luminance value one by one to obtain the scaled luminance data, and then the computer equipment can calculate the average value of the scaled luminance data to obtain the scaling average luminance value.

Further, the computer equipment determines a target interval that requires luminance adjustment based on the scaling average luminance value, and then determines a matched adaptive luminance adjustment manner to adjust the luminance data in the target interval based on the adaptive luminance adjustment manner. It should be noted that in the above steps, when the luminance data in the target interval is adjusted, the adjustment object is the luminance data that has been performed linear scaling processing.

In the above embodiment, the target interval that requires luminance adjustment is determined based on the statistical result of the luminance data, so that the adjustment range and the adjustment target of the luminance data can be determined, making the luminance adjustment process more accurate and the obtained enhanced image quality effect better.

In an embodiment, the determining at least one target interval to be performed luminance adjustment of the second image data according to the scaling average luminance value includes: dividing the luminance data after luminance linear scaling processing into a first luminance data set and a second luminance data set based on the scaling average luminance value; filtering out a first target luminance value with a highest occurrence frequency from the first luminance data set, and filtering out a second target luminance value with a highest occurrence frequency from the second luminance data set; and determining a target interval corresponding to the luminance data to be performed luminance adjustment according to frequency values respectively corresponding to the first target luminance value and the second target luminance value.

In an embodiment, as shown in FIG. 5, the scaling average luminance value M divides the abscissa corresponding to the scaled luminance data into two parts, that is, the first luminance data set including the luminance data ranges from 0 to M, and the second luminance data set including the luminance data greater than M. Further, based on the statistical result of the luminance data corresponding to FIG. 5, the computer equipment filters out the first target luminance value with the highest occurrence frequency from the first luminance data set, and filters out the second target luminance value with the highest occurrence frequency from the second luminance data set. Then the computer equipment determines a target interval to be performed luminance adjustment of the luminance data based on the frequency values respectively corresponding to the first target luminance value and the second target luminance value.

As shown in FIG. 5, the computer equipment determines the corresponding luminance value MLL (the luminance value corresponding to the middle frequency of the left side of the dark area) and the corresponding luminance value MLR (the luminance value corresponding to the middle frequency of the right side of the dark area) based on half of the frequency value corresponding to the first target luminance value. Most of the luminance data in the first luminance data set are within the MLL–MLR interval, thus it is determined that the luminance data within the MLL–MLR interval is the object that needs to be adjusted. It should be noted that in this embodiment, the frequency values corresponding to MLL and MLR are not necessarily half of the maximum frequency value of the first luminance data set. Based on specific image enhancement requirements, this weight can be specifically changed, and this embodiment is not to be regarded as a specific limitation thereof.

In the above embodiment, the statistical result of the luminance data is analyzed through the scaling average luminance value, and the target interval that needs to be performed luminance adjustment is determined, which may achieve an accurate processing on the luminance data of the image data and improve the quality of image luminance enhancement.

In an embodiment, the determining the target interval corresponding to the luminance data to be performed luminance adjustment according to the frequency values respectively corresponding to the first target luminance value and the second target luminance value includes: determining a first luminance frequency of the first target luminance value in a first luminance data set; determining a second luminance frequency of the second target luminance value in the second luminance data set; obtaining a first luminance data adjustment interval based on the first luminance frequency, the first target luminance value being within the first luminance data adjustment interval; obtaining a second luminance data adjustment interval based on the second luminance frequency, the second target luminance value being within the second luminance data adjustment interval; and using the first luminance data adjustment interval and the second luminance data adjustment interval as target intervals to be performed luminance adjustment of the second image data.

In some embodiments, the obtaining the first luminance data adjustment interval based on the first luminance frequency includes: determining a luminance value corresponding to a middle frequency of a left side of a dark area and a luminance value corresponding to a middle frequency of a right side of the dark area according to the first luminance frequency, the middle frequency of the dark area being half of the first luminance frequency; and determining a first luminance data adjustment area from the first luminance data set according to the luminance value corresponding to the middle frequency of the left side of the dark area and the luminance value corresponding to the middle frequency of the right side of the dark area.

In some embodiments, the obtaining the second luminance data adjustment interval based on the second luminance frequency includes: determining a luminance value corresponding to a middle frequency of a left side of a bright area and a luminance value corresponding to a middle frequency of a right side of the bright area according to the second luminance frequency, the middle frequency of the bright area being half of the second luminance frequency; and determining a second luminance data adjustment area from the second luminance data set according to the luminance value corresponding to the middle frequency of the left side of the bright area and the luminance value corresponding to the middle frequency of the right side of the bright area.

In an embodiment, as shown in FIG. 5, the computer equipment determines the corresponding luminance values MLL and MLR based on the frequency value corresponding to the first target luminance value. It can be seen from FIG. 5 that most of the luminance data in the first luminance data set are within the MLL–MLR interval, so that it is determined that the luminance data with values within the MLL–MLR interval is the object that needs to be adjusted. Similarly, according to the frequency value corresponding to the second target luminance value, it is determined that the object that needs to be adjusted in the second luminance data set is the luminance data ranges from MHL (the luminance value corresponding to the middle frequency of the left side of the bright area) to MHR (the luminance value corresponding to the middle frequency of the right side of the bright area).

In the above embodiment, through the luminance data statistical result, the target interval in which the luminance data in the first luminance data set and the second luminance data set is relatively concentrated can be determined. By adjusting the target interval, the enhancement for the first image data can be better achieved.

In an embodiment, the luminance adjustment parameter includes the maximum required luminance, and determining the adaptive luminance adjustment manner matching the second image data includes: multiplying the maximum required luminance by a first weight to obtain a first luminance threshold, and multiplying the maximum required luminance by a second weight to obtain a second luminance threshold, the first weight being smaller than the second weight; and determining the adaptive luminance adjustment manner matching the second image data from a preset luminance adjustment manner according to the scaling average luminance value, the first target luminance value, the second target luminance value, the first luminance threshold and the second luminance threshold.

In an embodiment, as shown in FIG. 5, the computer equipment determines the corresponding luminance values MLL and MLR based on half of the frequency value corresponding to the first target luminance value. Most of the luminance data in the first luminance data set will be within the MLL–MLR interval, so that it is determined that the luminance data within the MLL–MLR interval is the object that needs to be adjusted. Similarly, according to the frequency value corresponding to the second target luminance value, it is determined that the object that needs to be adjusted in the second luminance data set is the luminance data within the MHL–MHR interval. It should be noted that in this embodiment, the frequency values corresponding to MLL and MLR are not necessarily half of the maximum frequency value in the first luminance data set. Based on specific image enhancement requirements, this weight can be specifically changed, and this embodiment is not to be regarded as a specific limitation thereof.

The preset luminance adjustment manner includes six situations described in the following embodiments. For details, please refer to the description below.

In the above embodiment, the computer equipment determines the target interval in which the luminance data in the first luminance data set and the second luminance data set is relatively concentrated based on the first target luminance value, the second target luminance value and the frequency values corresponding to the first target luminance value and the second target luminance value. By adjusting the target interval, the enhancement for the first image data can be better achieved.

In an embodiment, the adaptive luminance adjustment manner includes a gamma adjustment formula corresponding to the luminance data, and the method further includes a step of presetting an approximate gamma formula corresponding to the luminance data. The step includes: calculating a normalized gamma value corresponding to each grayscale level based on a grayscale level of the first image data, and obtaining a gamma value mapping table corresponding to each grayscale level based the normalized gamma value corresponding to each grayscale level; using the luminance data and a gamma coefficient as variables to perform a bilinear interpolation calculation to obtain a first interpolation coefficient based on a variable representation, and using a difference value between a value one and a first interpolation coefficient as the second interpolation coefficient; mapping a luminance data variable to a grayscale space, determining a third interpolation coefficient based on a mapped luminance data variable, and using a difference value between the value one and the third interpolation coefficient as a fourth interpolation coefficient; determining a gamma approximate adjustment coefficient corresponding to the luminance data based on the first interpolation coefficient, the second interpolation coefficient, the third interpolation coefficient, the fourth interpolation coefficient, and the gamma value mapping table corresponding to each grayscale level; and determining a gamma adjustment formula corresponding to the luminance data according to the gamma approximate adjustment coefficient and the maximum luminance.

In an embodiment, the computer equipment will perform the adaptive luminance adjustment on the luminance data based on the mapping relationship between the gamma coefficient and the luminance data. That is, before performing specific image enhancement processing, the computer equipment has already obtained the above mapping relationship. In some embodiments, the computer equipment can set the gamma coefficient bounded, and the endpoint list TS can be expressed as $\{A1, A2, \ldots, An, 1, 1/An, \ldots, 1/A2, 1/A1\}$. Then, based on the grayscale level of 0-255, the gamma coefficient is normalized to obtain the corresponding gamma value mapping table. The computer equipment can normalize the gamma coefficient through the following formula: $GT=(x/255)^P$. GT is the normalized gamma coefficient, x is the grayscale level (which ranges from 0 to 255), and the value of P is the value of the segmentation endpoint list TS. In this way, x is substituted from 0 to 255 into the above normalized gamma formula, which is not necessary for P=1, to calculate the normalized gamma mapping table for the rest of the different P-values in the 256 grayscale levels.

Further, the computer equipment can use the luminance data variable y and the gamma coefficient variable J before adjustment as bilinear interpolation variables, and determines that J is within a certain interval of the endpoint list TS, that is, $TS[i] \le J \le TS[i+1]$, $i \in [0, 2n]$, then the first interpolation coefficient c1 and the second interpolation coefficient c2 can be obtained:

$$c1=(J-TS[i])/(TS[i+1]-TS[i]);$$

$$c2=1-c1.$$

In this case, the computer equipment will map y to the grayscale space (256 space) to obtain y', and the third interpolation coefficient d1 is set to be the difference value between the mapped luminance data and the value rounded down from the mapped luminance data. The fourth interpolation coefficient d2 is set to be the difference value between value one and the third interpolation coefficient d1. For the specific calculation method, please refer to the following formula:

$y'=y\times256/I$; $y1=\lfloor y' \rfloor$; $y2=y1+1$; $d1=y'-y1$; $d2=1-d1$. $\lfloor\ \rfloor$ means rounding down.

Then, assuming that GT1 is the gamma mapping table with the gm coefficient equal to TS[i] and GT2 is the gamma mapping table with the gm coefficient equal to TS[i+1], then the corresponding gamma approximate adjustment coefficient is $G=GT1[y1]\times c2\times d2+GT1[y2]\times c2\times d1+GT2[y1]\times c1\times d2+GT2[y2]\times c1\times d1$, so that the computer equipment use the product of the gamma approximation adjustment coefficient G and the maximum luminance I as the adjusted luminance data. That is to say, the gamma adjustment formula corresponding to the luminance data is $Y=I\times G$.

In the above embodiment, by obtaining the gamma adjustment formula corresponding to the luminance data in advance, when processing the luminance data, the computer equipment does not need to calculate the gamma coefficient separately for each luminance data, and can adaptively adjust the luminance data based on this gamma formula. In this way, the computing pressure of the computer equipment can be greatly saved and the image enhancement processing efficiency of the computer equipment can be improved.

In an embodiment, the chroma adjustment parameter includes a hue rotation angle, a saturation adjustment coefficient and a chroma compensation table, and the adjusting the chroma data based on the chroma adjustment parameter to obtain adjusted chroma data includes: making statistics on the luminance data before adjustment based on the luminance adjustment parameter, determining a scaling coefficient based on a statistical result and maximum required luminance of the luminance adjustment parameter, the statistical result including a minimum luminance value, a maximum luminance value and an initial average luminance value of the luminance data before adjustment; performing a two-dimensional rotation on the chroma data according to the hue rotation angle to obtain first chroma data; converting the first chroma data according to the saturation adjustment coefficient and the scaling coefficient to obtain second chroma data; and performing a chroma compensation on the second chroma data to obtain third chroma data according to the chroma compensation table, and using the third chroma data as adjusted chroma data.

In an embodiment, after the adjustment for the luminance data is finished, chroma adjustment is further required to ensure that the chroma data does not have color distortion in the final enhanced image. The chroma adjustment parameter in this embodiment includes a hue rotation angle, a saturation adjustment coefficient and a chroma compensation table. The computer equipment first performs two-dimensional rotation on the chroma data based on the hue rotation angle to obtain the first chroma data, and then adjusts the first chroma data according to the scaling coefficient and the saturation adjustment coefficient to obtain the second chroma data. Finally, the chroma compensation is performed on the second chroma data based on the chroma compensation table to obtain the adjusted chroma data. Regarding the specific determination method of the scaling coefficient, reference may be made to the specific description in the foregoing embodiments.

In the above embodiment, specific chroma adjustments are made to the chroma data according to the hue rotation angle, the saturation adjustment coefficient and the chroma compensation table, so that the adjusted chroma data can effectively avoid the color distortion problem of the third image data during the process of displaying the third image data.

Figure 3:
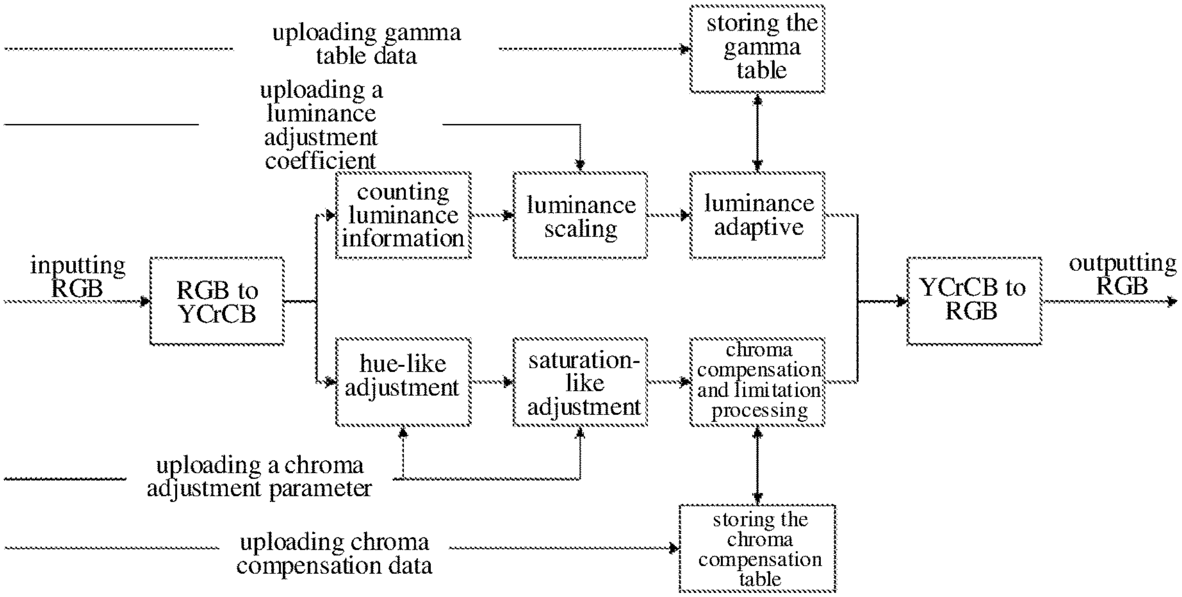
FIG. 3 is a schematic diagram of data flow of an image enhancement step according to some embodiments.

A specific embodiment of the image enhancement method is as shown in FIG. 3.

The principle of the present application is to perform YCrCb conversion on the RGB image data, then the luminance component Y is taken out, and the luminance adjustment parameter inputted externally is combined to perform the luminance adjustment processing, which includes the luminance linear scaling and the luminance adaptive adjustment. The adaptive algorithm adopts multiple sections of different coefficient gamma transformations, and the chroma component CrCb also needs to be adjusted according to the chroma adjustment parameter inputted externally and the parameter processed internally. Finally, the adjusted YCrCb is converted back to the RGB display data. The process is as shown in FIG. 1. The luminance adjustment parameter, the chroma adjustment parameter, the gamma mapping table and the chroma compensation table are pre-loaded. When the image data is inputted, the RGB is first converted to YCrCb, and the information is divided into two parts, namely the luminance information Y and the chroma information CrCb. Then statistics is made on the luminance information. After the relevant data is obtained, the luminance linear scaling is performed. Then the luminance adaptive processing will be performed according to the statistical data and the pre-loaded gamma table. A similar hue adjustment will first be performed on the chroma information, then a similar saturation adjustment will be performed, and finally compensation and restriction processing will be performed according to the chroma compensation table. After these two parts of information are processed, YCrCb is converted to RGB for outputting and displaying.

Figure 9:
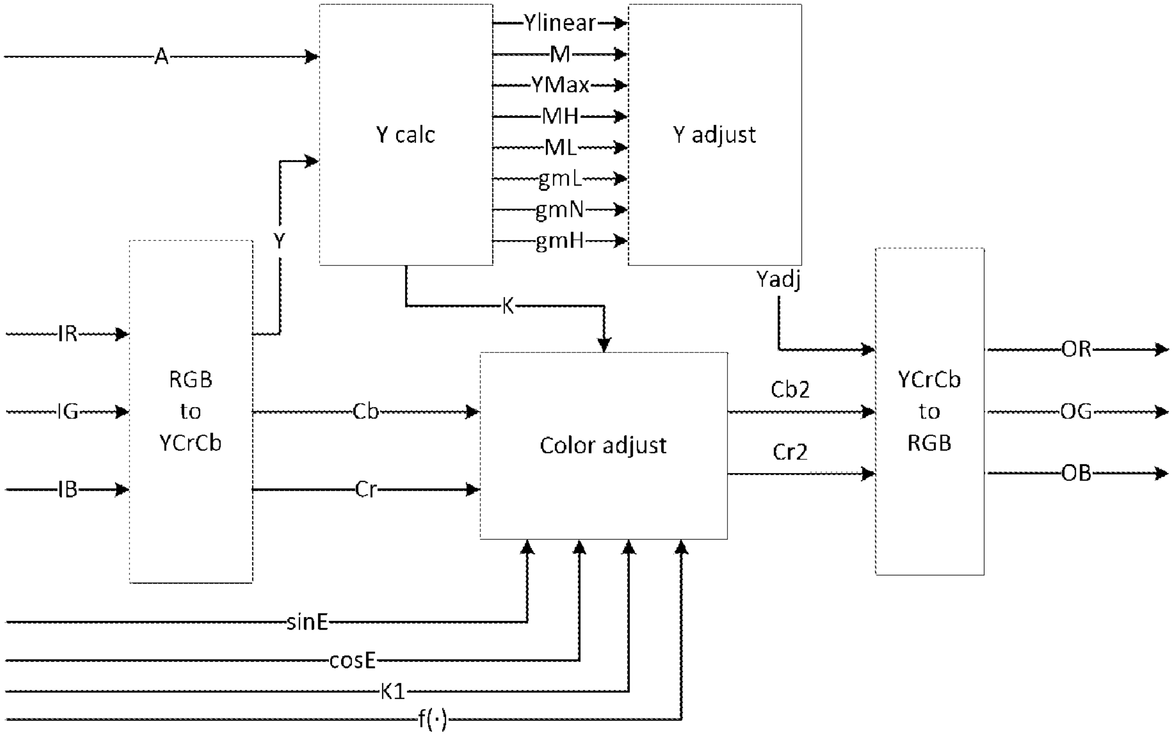
FIG. 9 is a schematic diagram of an image enhancement device according to some embodiments.

As shown in FIG. 9, the implementation principle of this scheme is divided into 5 modules. "RGB to YCrCb" is the module converting the RGB color to the YCrCb color. This module converts the RGB color into the YCrCb color, and each color gamut conversion formula is different. In this embodiment, the BT709 color gamut conversion formula is taken as an example:

$$Y=(0.2126\times R)+(0.7152\times EG)+(0.0722\times B)$$

$$Cr=(0.5\times R)-(0.4542\times EG)-(0.0458\times B)$$

$$Cb=(0.5\times B)-(0.114563\times R)-(0.385437\times G)$$

The converted Y is the luminance information, and Cr and Cb are the chroma information.

The "Y calc" module is a luminance calculation module that includes luminance statistics and luminance linear scaling. First, the maximum required luminance YMax (YMax=A) is obtained before scaling processing, and then all luminance of the image is counted to determine the minimum luminance value Ymin, the maximum luminance value Ymax, and the calculated average luminance value Ymean of the image before scaling. Finally, luminance linear scaling is performed on the image, so that the minimum luminance is adjusted to 0, the maximum luminance is the adjusted maximum required luminance YMax, and the scaling coefficient K is calculated by the following formula:

$$K=Y\text{Max}/(Y\text{max}-Y\text{min})$$

The scaling formula is calculated by the following formula:

$$Y\text{linear}=K\times(Y\text{cur}-Y\text{min})$$

In the formula, Ylinear is the luminance after linear scaling, and Ycur is the luminance before scaling.

The determination threshold of the low-luminance image and the over-luminance image can be calculated based on YMax. In this embodiment, the determination basis of the low-luminance image is that the average luminance is lower than 35% of the maximum luminance, which is the threshold TH_L. The determination basis of the over-luminance image is that the average luminance is higher than 65% of the maximum luminance, which is the threshold TH_H. The calculation formulas of the threshold TH_L and the threshold TH_H are:

$$TH\_L=Y\text{Max}\times 0.35$$

$$TH\_H=Y\text{Max}\times 0.65$$

The average luminance M after scaling is calculated by the following formula:

$$M=K\times(Y\text{mean}-Y\text{min})$$

Using M as the boundary, the image luminance is divided into the bright area and the dark area. Each frame of the image in the two areas may be different since they are distinguished by the average luminance. As shown in FIG. 5, the occurrence frequency of each luminance is counted. According to the statistical result, the luminance values MH and ML with the highest occurrence frequency in the bright area and the dark area are respectively obtained. In this embodiment, the luminance-dense area of each area is an interval within two points, the two points are farthest from both sides of a point with the maximum occurrence frequency value in the area, and each occurrence frequency value of the two points is greater than or equal to half of the frequency value of the point with the maximum occurrence frequency value. As shown in FIG. 5, the points MHL, MHR, MLL and MLR are farthest from both sides of the points MH and ML, and the frequency values of the points MHL, MHR, MLL and MLR are respectively greater than or equal to half of the frequency values of the points MH and ML, thereby determining two luminance-dense areas in the dark area and the bright area. MHL and NMR respectively represent the left side point and the right side point farthest from both sides of the point MH and the frequency values of MHL and MHR are greater than or equal to MH/2. MLL and MLR respectively represent the left side point and the right side point farthest from both sides of the point ML and the frequency values of MLL and MLR are greater than or equal to ML/2. These four values are used to determine the adjusted gamma curve coefficient. When the both sides of the points MH and ML are very narrow, the values of MHR−MHL and MLR−MLL are small, which means that more pixel luminance is concentrated near the points MH and ML, so that the gamma curve is steeper and can better enlarge the luminance contrast in the luminance-dense area. If the values of MHR−MHL and MLR−MLL are large, it means that the luminance distribution is relatively uniform, and the gamma coefficient will be close to 1, making the gamma curve closer to y=x, which means that no adjustment should be made. The gamma coefficient will be calculated based on different situations. According to the luminance statistics in FIG. 5, the steepness of the gamma curve is determined based on the "steepness" of the two waves in the bright area and the dark area. The contrast of the luminance-dense area is increased, thereby improving image enhancement effect. Since there are many luminance distribution situations, six processing situations will be divided in the following based on the values of M, MH, ML, TH_L and TH_H.

Figure 4:
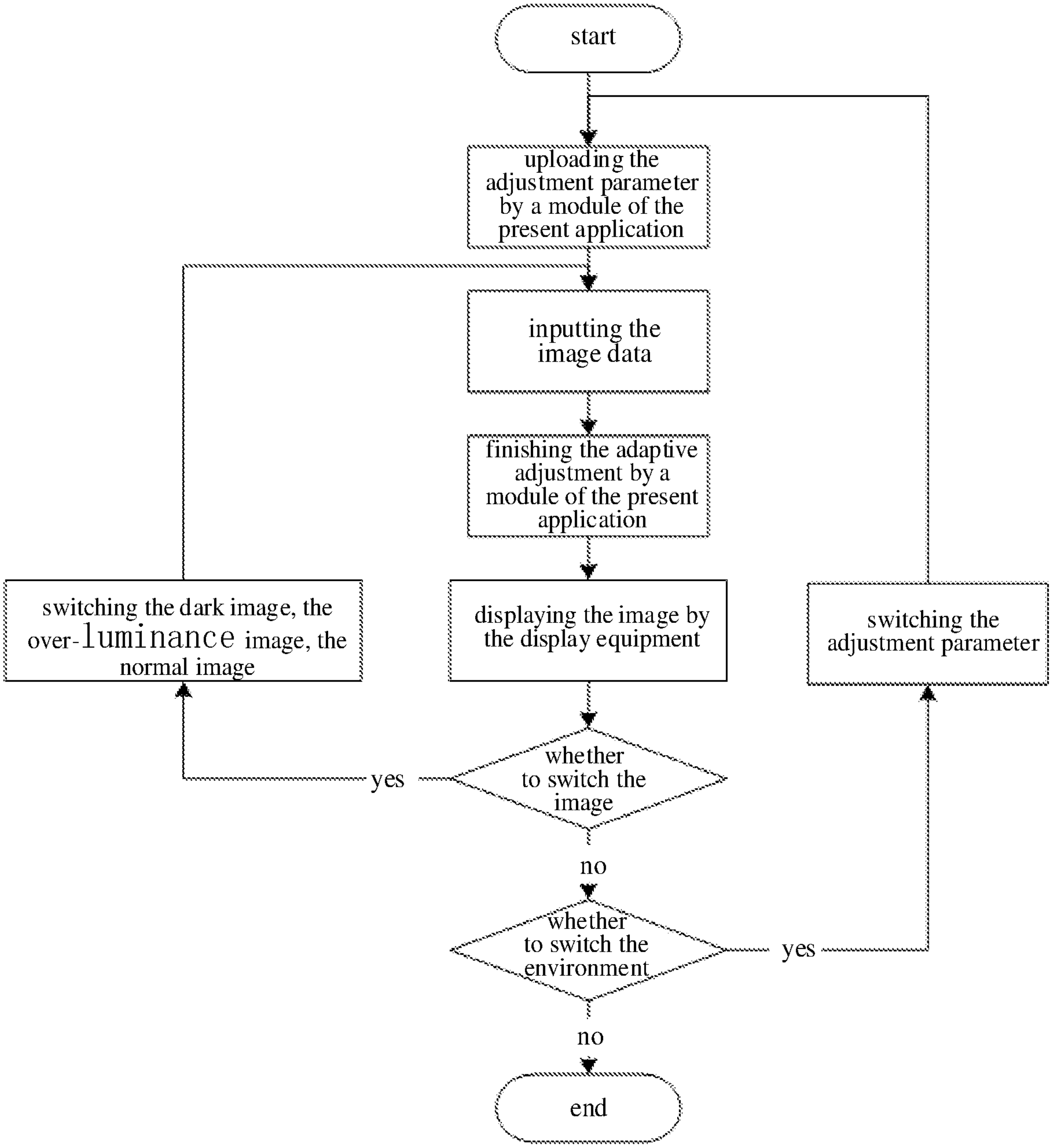
FIG. 4 is a schematic flowchart of the image enhancement method according to some embodiments.

The "Y adjust" module is a luminance adaptive adjustment module. The luminance adaptive adjustment is performed according to the parameters M, MH, ML, TH_L and TH_H. The two thresholds of TH_L and TH_H divide the entire luminance interval into a low luminance area, a normal area and an over-luminance area. As shown in FIG. 4, there are six situations. The abscissa of each subgraph is the luminance before adaptive adjustment, and the ordinate is the luminance after adaptive adjustment. The solid curve of each graph is the adjustment function.

The First Situation

Figure 6:
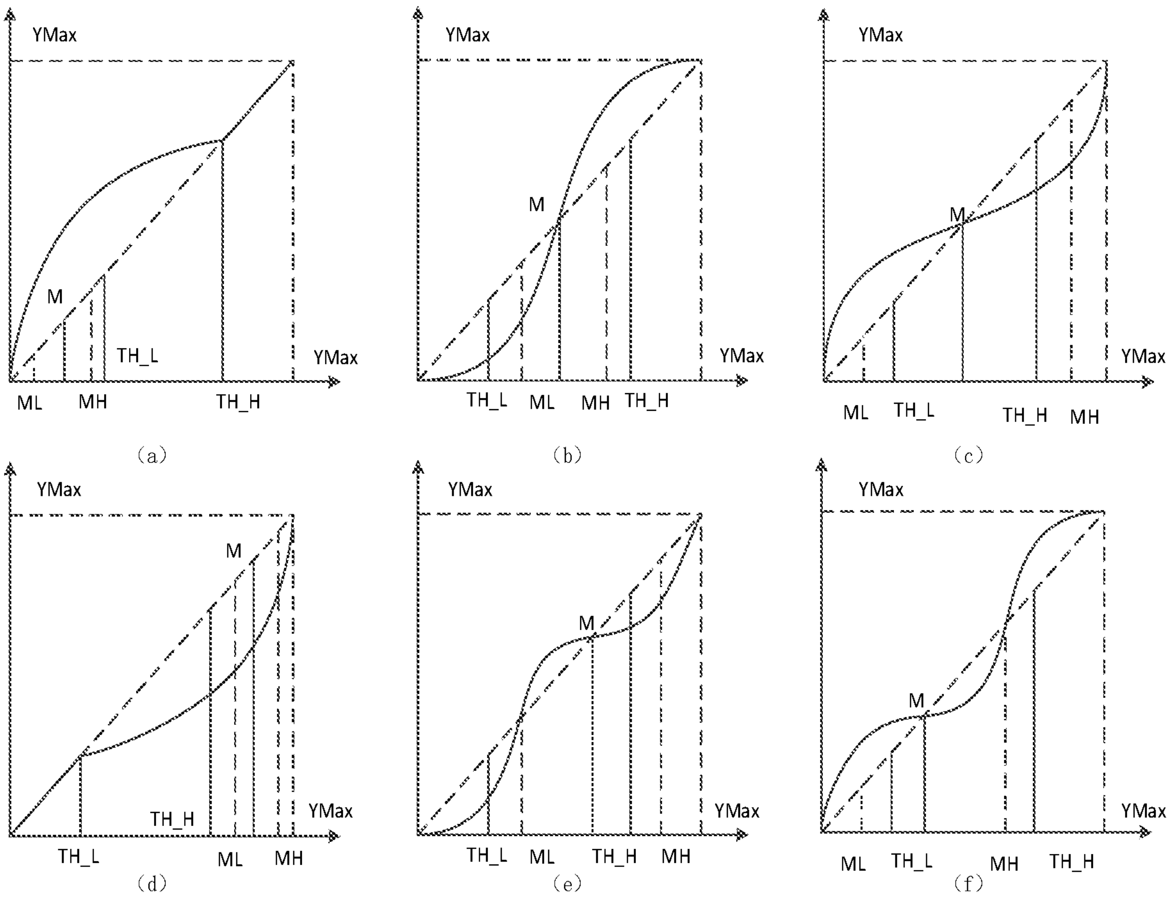
FIG. 6 is a luminance adaptive adjustment function diagram of the image enhancement method according to some embodiments.

As shown in the subgraph of FIG. 6(*a*), when MH≤TH_L (that is, when the second target luminance value is less than or equal to the first luminance threshold), it means that most pixels are located in the low-luminance area and the image is too dark. The adaptive adjustment curve is divided into two sections. The low-luminance area and the normal area (0~TH_H interval) are adjusted and brightened, and the luminance contrast of the luminance-dense area is increased. Adopting the gamma curve for adjustment can avoid hue shift caused by over-gain. The calculation formula of the gamma coefficient value is:

$$\mathrm{gm}=(MHR-MLL)/TH\_H$$

The luminance adjustment formula is:

$$Yadj=\begin{cases}\mathrm{TH\_H}\times(Ylinear/\mathrm{TH\_H})^{gm}, & Ylinear<\mathrm{TH\_H}\\ Ylinear, & Ylinear\geq\mathrm{TH\_H}\end{cases}$$

Yadj is the adjusted luminance data, TH_H is the second luminance threshold, and Ylinear is the luminance data after luminance linear scaling processing. The minimum value of gm is ⅓. The smaller the gm, the steeper the low-luminance part of the curve, the greater the contrast, and the greater the image average luminance, while the highlight area remains the scaling result.

The Second Situation

As shown in the subgraph of FIG. 6(*d*), when ML≥TH_H (that is, when the first target luminance value is greater than or equal to the second luminance threshold), it means that the image is too bright. The adaptive adjustment curve is divided into two sections. The over-luminance area and the normal area (TH_L~YMax interval) of the image are darken and adjusted through the gamma curve. The calculation formula of the gamma coefficient value is:

$$\mathrm{gm}=(Y\,\mathrm{Max}-TH\_L)/(MHR-MLL)$$

The luminance adjustment formula is:

$$Yadj=\begin{cases}Ylinear, & Ylinear\leq\mathrm{TH\_L}\\ \mathrm{TH\_L}+(Y\mathrm{Max}-\mathrm{TH\_L})\times((Ylinear-\mathrm{TH\_L})/(Y\mathrm{Max}-\mathrm{TH\_L}))^{gm}, & Ylinear>\mathrm{TH\_L}\end{cases}$$

Yadj is the adjusted luminance data, and Ylinear is the luminance data after luminance luminance linear scaling processing. YMax is the maximum required luminance, and TH_L is the first luminance threshold. The maximum value of gm is 3. The larger the gm, the steeper the highlight part of the curve, the greater the contrast, and the smaller the image average luminance, while the low-luminance area remains the scaling result.

The Third Situation

As shown in the subgraph of FIG. 6(*b*), when ML≥TH_L and MH≤TH_H (that is, when the first target luminance value is greater than or equal to the first luminance threshold, and the second target luminance value is less than or equal to the second luminance threshold), it means that the image luminance is mainly concentrated in the normal area. The adaptive adjustment curve is divided into two sections of the gamma curve. The gamma coefficient values in the 0~M interval and the M~YMax interval are gmL and gmH respectively. The calculation formula is:

$$\mathrm{gm}L=M/(MLR-MLL)$$

$$\mathrm{gm}H=(MHR-MHL)/(Y\,\mathrm{Max}-M)$$

The maximum value of gmL is 3, and the minimum value of gmH is ⅓.

The luminance adjustment formula is:

$$Yadj=\begin{cases}M\times(Ylinear/M)^{gmL}, & Ylinear\leq M\\ M+(Y\mathrm{Max}-M)\times((Ylinear-M)/(Y\mathrm{Max}-M))^{gmH}, & Ylinear>M\end{cases}$$

Yadj is the adjusted luminance data, and Ylinear is the luminance data after luminance linear scaling processing. M is the scaling average luminance value, and YMax is the maximum required luminance.

The Fourth Situation

As shown in the subfigure of FIG. 6(*c*), when ML<TH_L and MH>TH_H (that is, when the first target luminance value is less than the first luminance threshold, and the second target luminance value is greater than the second luminance threshold), it means that the image luminance is mainly concentrated in the low-luminance area and the over-luminance area. The adaptive adjustment curve is divided into two sections of the gamma curve. The gamma coefficient values in the 0~M interval and M~YMax interval are gmL and gmH respectively. The calculation formula is:

$$gmL=(MLR-MLL)/M$$

$$gmH=(Y\,\mathrm{Max}-M)/(MHR-MHL)$$

The maximum value of gmH is 3, and the minimum value of gmL is ⅓.

The luminance adjustment formula is:

$$Yadj=\begin{cases} M\times(Ylinear/M)^{gmL}, & Ylinear\le M\\ M+(Y\mathrm{Max}-M)\times((Ylinear-M)/(Y\mathrm{Max}-M))^{gmH}, & Ylinear>M \end{cases}$$

Yadj is the adjusted luminance data. M is the scaling average luminance value. Ylinear is the luminance data after the luminance linear scaling, and YMax is the maximum required luminance.

The Fifth Situation

As shown in the subfigure of FIG. 6(*e*), when TH_L<ML<TH_H and MH>TH_H (that is, the first luminance threshold is less than the first target luminance value, and the first target luminance value is less than the second luminance threshold, and the second luminance value is greater than the second luminance threshold), it means that the image luminance is mainly concentrated in the low-luminance area and the normal area. The adaptive adjustment curve is divided into three sections of the gamma curve. The gamma coefficient values of the 0~ML interval, the ML~M interval and the M~YMax interval are gmL, gmN and gmH respectively, and the calculation formula is:

$$gmL=M/(MLR-MLL)$$

$$gmN=(M-ML)/(Y\,\mathrm{Max}-TH\_L)$$

$$gmH=(Y\,\mathrm{Max}-M)/(MHR-MHL)$$

The maximum value of gmL is 3. The minimum value of gmN is ⅓, and the maximum value of gmH is 3.

The luminance adjustment formula is:

$$Yadj=\begin{cases} ML\times(Ylinear/ML)^{gmL}, & Ylinear\le ML\\ ML+(M-ML)\times((Ylinear-ML)/(M-ML))^{gmN}, & ML<Ylinear\le M\\ M+(Y\mathrm{Max}-M)\times((Ylinear-M)/(Y\mathrm{Max}-M))^{gmH}, & Ylinear>M \end{cases}$$

Yadj is the adjusted luminance data. ML is the first target luminance value. Ylinear is the luminance data after luminance linear scaling. M is the scaling average luminance value, and YMax is the maximum required luminance.

The Sixth Situation

As shown in the subfigure of FIG. 6(*f*), when ML<TH_L and TH_L<MH<TH_H (that is, the first target luminance value is less than the first luminance threshold, the first luminance threshold is less than the second target luminance value, and the second target luminance value is less than the second luminance threshold), it means that the image luminance is mainly concentrated in the low-luminance area and the normal area. The adaptive adjustment curve is divided into three sections of the gamma curve. The gamma coefficient values of the 0~M interval, the M~MH interval and the MH~YMax the interval are gmL, gmN and gmH respectively, and the calculation formula is:

$$gmL=(MLR-MLL)/M$$

$$gmN=(MH-M)/TH\_H$$

$$gmH=(Y\,\mathrm{Max}-M)/(MHR-MHL)$$

The maximum value of gmL is 3, the minimum value of gmN is ⅓, and the maximum value of gmH is 3.

The luminance adjustment formula is:

$$Yadj=\begin{cases} M\times(Ylinear/M)^{gmL}, & Ylinear\le M\\ M+(MH-M)\times((Ylinear-M)/(MH-M))^{gmN}, & M<Ylinear\le MH\\ MH+(Y\mathrm{Max}-MH)\times((Ylinear-MH)/(Y\mathrm{Max}-MH))^{gmH}, & Ylinear>MH \end{cases}$$

Yadj is the adjusted luminance data. M is the scaling average luminance value. MH is the second target luminance value. Ylinear is the luminance data after luminance linear scaling processing, and YMax is the maximum required luminance.

The above six situations include adaptive adjustment such as brightening the dark image, darkening the over-luminance image, and balancing the uneven luminance image, which all use gamma operations with indefinite coefficient values. The gamma operation formula can be simplified as:

$$Y=I\times(y/I)^{J}$$

In the formula, Y is the luminance after gamma adjustment, y is the luminance before adjustment, I is the maximum luminance, and J is the gamma coefficient, namely gm, gmL, gmN and gmH in the formulas of the above six situations. In the embodiment of the present application, the gamma coefficient J is limited to the closed interval [⅓, 3] to ensure the adjustment effect.

Whether the gamma operation is implemented in hardware or software, the efficiency is relatively low. The conventional method is to store the gamma operation result with a fixed gamma coefficient, and read it directly when needed. The gamma coefficient in the present application is obtained by calculation and are indefinite values, that is, it is impossible to calculate and store all gamma values in the memory. Therefore, in order to avoid direct gamma operations, the present application proposes an approximate algorithm to improve efficiency, that is, the normalized gamma mapping table with multiple different coefficients and the bilinear interpolation are calculated in advance to obtain an approximate result. In an embodiment, first, the gamma coefficient is 'bounded', that is, limit the maximum gamma value and the minimum gamma value, otherwise segmentation cannot be performed. Then the interval of the gamma coefficient is divided. If the gamma coefficient is more than 1, it is best to divide the gamma into two areas, namely the brightening area (0,1) and the darkening area (1,+∞). The gamma segmentation is symmetrical in the two areas. That is, if the value in one interval is a, then the value in another interval is 1/a. This segmentation method is on the basis that the gamma curves with the two coefficients are in a symmetrical relationship of the y=x straight line, so that the rate of change for brightening is consistent with the rate of change for darkening. In addition, 'bounded' can also limit the left and right boundaries with reference to this method. The endpoint list TS segmented by this method can be expressed as {A1, A2, . . . , An, 1, 1/An, . . . , 1/A2, 1/A1}. Then the value of x is substituted from 0 to 255, and the value of P is substituted from the values in the segmented endpoint list sequentially, and the normalized gamma formula is:

$$GT=(x/255)^{P}$$

Substituting into the normalized gamma calculation formula, which is not necessary for P=1, to calculate the remaining 2n normalized gamma mapping tables in the 256 levels.

Figure 7:
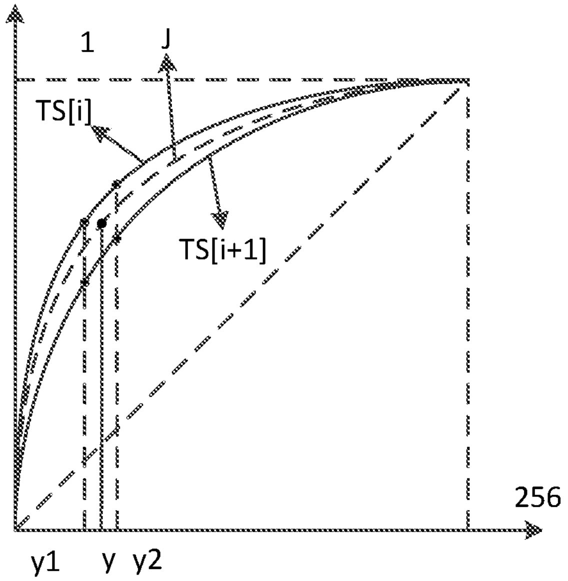
FIG. 7 is a schematic diagram of gamma interpolation calculation of the image enhancement method according to some embodiments.

Finally, as shown in FIG. 7, using the luminance y and the gamma coefficient J as bilinear interpolation variables, determining that J is within a certain interval of TS, that is, TS[i]≤J≤TS[i+1], i∈[0, 2n], the interpolation coefficients c1 and c2 can be calculated with the following formula:

$$c1=(J-TS[i])/(TS[i+1]-TS[i])$$

$$c2=1-c1$$

Mapping y to the value y' in 256 space, and two other interpolation coefficients d1 and d2 with the following formula:

$$y'=y\times 256/I$$

$$y1=\lfloor y'\rfloor$$

$$y2=y1+1$$

$$d1=y'-y1$$

$$d2=1-d1$$

⌊ ⌋ means rounding down. Assuming that GT1 is the gamma mapping table with the gm coefficient equal to TS[i], and GT2 is the gamma mapping table with the gm coefficient equal to TS[i+1]. Then the gamma approximate value Y of y is:

$$G=GT1[y1]\times c2\times d2+GT1[y2]\times c2\times d1+GT2[y1]\times c1\times d2+GT2[y2]\times c1\times d1$$

$$Y=I\times G$$

The accuracy of this approximation value is related to the level of the gamma table, the size of the segmented interval of the gm coefficient, and the position of y in the formula. The above six situations indicates that the gm coefficient of the embodiment of the present application is limited to the closed interval [⅓, 3], which is divided into eight segments, and the segmented endpoint list TS is the mapping table of 9 different gamma coefficients, namely {⅓, ⅖, ½, ⅔, 1, 3/2, 2, 5/2, 3}. When gm=1, the gamma curve is a linear function which does not need to make a mapping table, and just a gamma mapping table in 256 levels should be made for the remaining 8 coefficients.

As shown in FIG. 9, the "Color adjust" module is for chroma adjustment, that is, the adjustment for CrCb. Although YCrCb completely separates the luminance Y and chroma CrCb, if only the Y component is adjusted, a hue shift is likely to occur. In the present application, the the function of approximate hue rotation is added with reference to the processing mode of the HSV color space, and two-dimensionally rotation is performed on the CrCb component at the angle E. This conversion is similar to the hue H rotation of HSV. This method is more efficient and convenient than the mutual conversion between RGB and HSV, and is convenient for the circuit implementation, and the approximate conversion formula is as following:

$$Cr1=Cr\times\sin E+Cb\times\cos E$$

$$Cb1=Cb\times\sin E+Cr\times\cos E$$

It can be seen from the conversion formula that when color rotation is not required, sin E can be equal to 1 and cos E can be equal to 0.

The above is the approximate hue adjustment, the following is the approximate HSV saturation adjustment, CrCb is adjusted synchronously, and the adjustment formula is as following:

$$Cr2=K\times(Cr1+K1\times f(Cr1))$$

$$Cb2=K\times(Cb1+K1\times f(Cb1))$$

Figure 8:
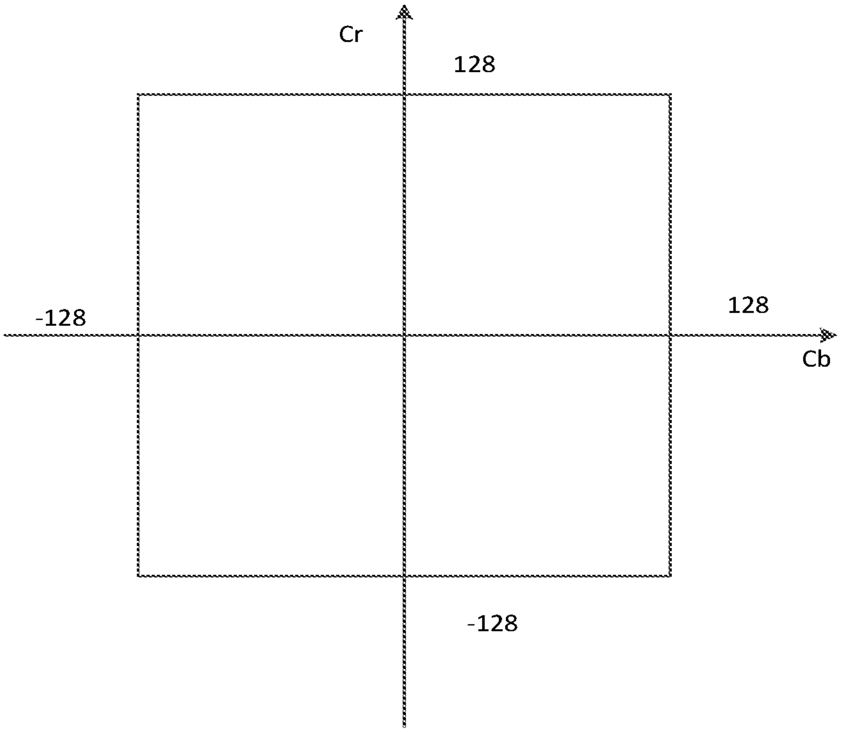
FIG. 8 is a two-dimensional chroma data coordinate diagram of the image enhancement method according to some embodiments.

K is the luminance scaling coefficient, which is calculated by the previous "Y calc" module. K1 is the color saturation adjustment coefficient outputted externally, and the default is 1. As shown in FIG. 8, the value of CrCb with the color of 256 grayscale levels ranges from −128 to 128. f(x) is the saturation difference of the same RGB color value in the HSV color space and the YCrCb color space, which is also the compensation value mapping table to avoid the rotation processing result Cr1 and Cb1 from crossing the boundary, and is obtained through a collection of the actual measurements.

The "YCrCb to RGB" module is a module configured for converting YCrCb color to RGB color, to convert the adaptively adjusted YCrCb color into RGB color, which can be directly outputted to an external display device for displaying.

Compared with the conventional method of converting RGB to HSV, the above method of converting RGB to YCrCb and then adjusting CrCb not only can achieve the color effect, but also can improves the conversion efficiency by 29%. Further, the gamma curve adaptive adjustment method with multi-segment variable coefficients is provided to adjust the contrast of grayscale dense areas well and improve the image enhancement effect. These variable gamma coefficients are replaced by multiple different coefficient gamma mapping tables calculated in advance and the bilinear interpolation algorithm, which further improves the computing efficiency of the computer equipment during the image enhancement process.

It should be understood that although the various steps in the flowcharts of FIG. 2 and FIG. 4 are shown in sequence as indicated by arrows, these steps are not necessarily performed in the order indicated by arrows. Unless explicitly stated in the present application, there is no strict order limitation on the execution of these steps, and these steps can be executed in other orders. Moreover, at least some of the steps in FIG. 2 and FIG. 4 may include multiple steps or multiple stages. These steps or stages are not necessarily executed at the same time, but may be executed at different times. These steps or stages is not necessarily executed in sequence, but may be performed in turn or alternately with other steps or at least part of other steps or stages.

Figure 10:
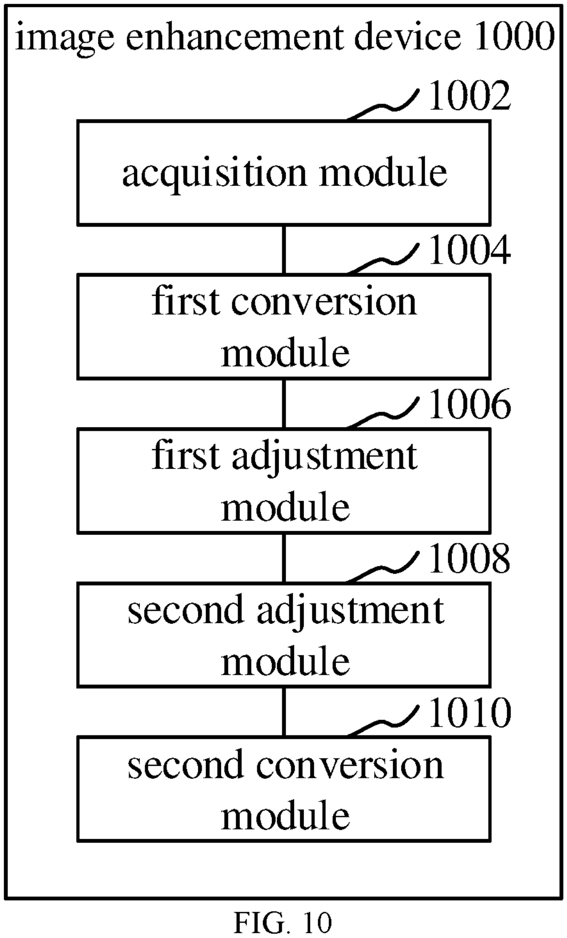
FIG. 10 is a structural block diagram of the image enhancement device according to some embodiments.

In some embodiments, as shown in FIG. 10, an image enhancement device 1000 is provided. The image enhancement device 1000 includes an acquisition module 1002, a first conversion module 1004, a first adjustment module 1006, a second adjustment module 1008, and a second conversion module 1010.

The acquisition module 1002 is configured to acquire the image adjustment parameter. The image adjustment parameter includes a luminance adjustment parameter and a chroma adjustment parameter.

The first conversion module 1004 is configured to convert first image data to be processed to second image data. The first image data and the second image data belong to different color dimensions, and the second image data includes luminance data and chroma data.

The first adjustment module 1006 is configured to adjust the luminance data based on the luminance adjustment parameter to obtain adjusted luminance data, determine whether the adjusted luminance data meets a preset luminance enhancement condition, update the luminance adjustment parameter when the adjusted luminance data does not meet a preset luminance enhancement condition, and continue to adjust the adjusted luminance data based on the updated luminance adjustment parameter until the final adjusted luminance data meets the luminance enhancement condition.

The second adjustment module 1008 is configured to adjust the chroma data based on the chroma adjustment parameter to obtain adjusted chroma data, determine whether the adjusted chroma data meets a preset chroma enhancement condition, update the chroma adjustment parameter when the adjusted chroma data does not meet the preset chroma enhancement condition, and continue to adjust the adjusted chroma data based on the updated chroma adjustment parameter until the final adjusted chroma data meets the chroma enhancement condition.

The second conversion module 1010 is configured to perform image color dimension conversion on the luminance data that meets the luminance enhancement condition and the chroma data that meets the chroma enhancement condition to obtain a third image data belonging to a same color dimension as the first image data, and use the third image data as a result of performing image enhancement processing on the first image data.

In the above image enhancement device, the luminance adjustment parameter and the chroma adjustment parameter for adjusting the image are first obtained. The first image data to be processed is converted into the second image data, and the second image data includes luminance data and chroma data. The first image data and the second image data belong to different color dimensions. Then the luminance data is adjusted based on the luminance adjustment parameter until the adjusted luminance data meets the preset luminance enhancement conditions. The chroma data is adjusted based on the chroma adjustment parameter until the adjusted chroma data meets the preset chroma enhancement conditions. Finally, the image color dimension conversion is performed on the luminance data that meets the luminance enhancement conditions and the chroma data that meets the chroma enhancement conditions, and then the third image data with the same color dimension as the first image data can be obtained, to obtain the result of performing image enhancement processing on the first image data. In the above scheme, after the first image data is converted into the second image data, parameter adjustment is performed on the luminance data and the chroma data respectively, and then the adjusted luminance data and chroma data are converted into the third image data with the same data color dimension as the first image data, which effectively overcomes the problem of poor color display of the processed image after the first image data is converted into the second image data, so that the obtained third image data can still maintain a better color display effect after the luminance processing.

In some embodiments, the above-mentioned first adjustment module is further configured to: make statistics on the luminance data before adjustment based on the luminance adjustment parameter, and determine a scaling coefficient based on a statistical result and maximum required luminance of the luminance adjustment parameter, the statistical result including a minimum luminance value, a maximum luminance value and an initial average luminance value of the luminance data before adjustment; perform luminance linear scaling processing on the luminance data of the second image data to obtain luminance data after luminance linear scaling processing according to the scaling coefficient, and determine a scaling average luminance value based on the luminance data after luminance linear scaling processing; determine at least one target interval to be performed luminance adjustment of the second image data according to the scaling average luminance value; determine an adaptive luminance adjustment manner matching the second image data; and adjust the luminance data in the at least one target interval to obtain the adjusted luminance data based on a matched adaptive luminance adjustment manner.

In the above embodiment, the target interval that needs to be adjusted is determined based on the statistical result of the luminance data. The adjustment range and the adjustment target of the luminance data can be clarified, making the luminance adjustment process more accurate and the obtained enhanced image quality effect better.

In some embodiments, the above-mentioned first adjustment module is further configured to: divide the luminance data after luminance linear scaling processing into a first luminance data set and a second luminance data set based on the scaling average luminance value; filter out a first target luminance value with a highest occurrence frequency from the first luminance data set, and filter out a second target luminance value with a highest occurrence frequency from the second luminance data set; and determine a target interval corresponding to the luminance data to be performed luminance adjustment according to frequency values respectively corresponding to the first target luminance value and the second target luminance value.

In the above embodiment, the statistical result of the luminance data can be analyzed through the scaling average luminance, and the target interval that needs to be adjusted is determined, which achieves the accurate processing on the luminance data of the image data and improves the quality of image luminance enhancement.

In some embodiments, the above-mentioned first adjustment module is further configured to: determining a first luminance frequency of the first target luminance value in a first luminance data set, and determine a second luminance frequency of the second target luminance value in the second luminance data set; obtain a first luminance data adjustment interval based on the first luminance frequency and the statistical result, the first target luminance value being within the first luminance data adjustment interval; obtain a second luminance data adjustment interval based on the statistical result and the second luminance frequency, the second target luminance value being within the second luminance data adjustment interval; and use the first luminance data adjustment interval and the second luminance data adjustment interval as target intervals to be performed luminance adjustment of the second image data.

In some embodiments, the first adjustment module is further configured to: determine a luminance value corresponding to a middle frequency of a left side of a dark area and a luminance value corresponding to a middle frequency of a right side of the dark area according to the first luminance frequency, the middle frequency of the dark area being half of the first luminance frequency; and determine a first luminance data adjustment area according to the luminance value corresponding to the middle frequency of the left side of the dark area and the luminance value corresponding to the middle frequency of the right side of the dark area.

In some embodiments, the first adjustment module is further configured to: determine a luminance value corresponding to a middle frequency of a left side of a bright area and a luminance value corresponding to a middle frequency of a right side of the bright area according to the statistical result and the second luminance frequency, the middle frequency of the bright area being half of the second luminance frequency; and determine a second luminance data adjustment area according to the luminance value corresponding to the middle frequency of the left side of the bright area and the luminance value corresponding to the middle frequency of the right side of the bright area.

In the above embodiment, through the luminance data statistical result, the target interval in which the luminance data in the first luminance data set and the second luminance data set is relatively concentrated can be determined. By adjusting the target interval, the first image data can be better enhanced.

In some embodiments, the luminance adjustment parameter includes the maximum required luminance. The above-mentioned first adjustment module is further configured to: multiply the maximum required luminance by a first weight to obtain a first luminance threshold, and multiply the maximum required luminance by a second weight to obtain a second luminance threshold, the first weight being smaller than the second weight; and determine the adaptive luminance adjustment manner matching the second image data from a preset luminance adjustment manner according to the scaling average luminance value, the first target luminance value, the second target luminance value, the first luminance threshold and the second luminance threshold.

In the above embodiment, the computer equipment can determine the target interval in which the luminance data in the first luminance data set and the second luminance data set is relatively concentrated based on the first target luminance value, the second target luminance value and the frequency values corresponding to the first target luminance value and the second target luminance value. By adjusting the target interval, the enhancement of the first image data can be better achieved.

In some embodiments, the device further includes a mapping module. The mapping module is configured to: calculate a normalized gamma value corresponding to each grayscale level based on a grayscale level of the first image data, and obtain a gamma value mapping table corresponding to each grayscale level based the normalized gamma value corresponding to each grayscale level; use the luminance data and a gamma coefficient as variables to perform a bilinear interpolation calculation to obtain a first interpolation coefficient based on a variable representation, and use a difference value between a value one and a first interpolation coefficient as the second interpolation coefficient; map a luminance data variable to a grayscale space, determine a third interpolation coefficient based on a mapped luminance data variable, and use a difference value between the value one and the third interpolation coefficient as a fourth interpolation coefficient; determine a gamma approximate adjustment coefficient corresponding to the luminance data based on the first interpolation coefficient, the second interpolation coefficient, the third interpolation coefficient, the fourth interpolation coefficient, and the gamma value mapping table corresponding to each grayscale level; and determine a gamma adjustment formula corresponding to the luminance data according to the gamma approximate adjustment coefficient and the maximum luminance.

In the above embodiment, by obtaining the gamma adjustment formula corresponding to the luminance data in advance, when the computer equipment processes the luminance data, the computer equipment does not need to calculate the gamma coefficient separately for each luminance data, and can achieve adaptive adjustment on the luminance data, which can greatly save the computing pressure of the computer equipment and improve the image enhancement processing efficiency of the computer equipment.

In some embodiments, the chroma adjustment parameter includes a hue rotation angle, a saturation adjustment coefficient and a chroma compensation table, and the above mentioned second adjustment module is further configured to: make statistics on luminance data before adjustment based on the luminance adjustment parameter, determine a scaling coefficient based on a statistical result and maximum required luminance of the luminance adjustment parameter, the statistical result including a minimum luminance value, a maximum luminance value and an initial average luminance value of the luminance data before adjustment; perform a two-dimensional rotation on the chroma data according to the hue rotation angle to obtain first chroma data; convert the first chroma data according to the saturation adjustment coefficient and the scaling coefficient to obtain second chroma data; and perform a chroma compensation on the second chroma data to obtain third chroma data according to the chroma compensation table, and use the third chroma data as adjusted chroma data.

In the above embodiment, specific chroma adjustments are made to the chroma data through the hue rotation angle, the saturation adjustment coefficient and the chroma compensation table. The adjusted chroma data can effectively avoid the problem of color distortion of the third image data in the process of displaying the third image data.

For specific definition on the image enhancement device, please refer to the above definition on the image enhancement method, which will not be repeated here. All or part of the modules of the above image enhancement device can be implemented by software, hardware and combinations thereof. Each of the above modules may be embedded in or independent of the processor of the computer equipment in the form of hardware, or may be stored in the memory of the computer equipment in the form of software, so that the processor can call and execute the operations corresponding to the above modules.

Figure 11:
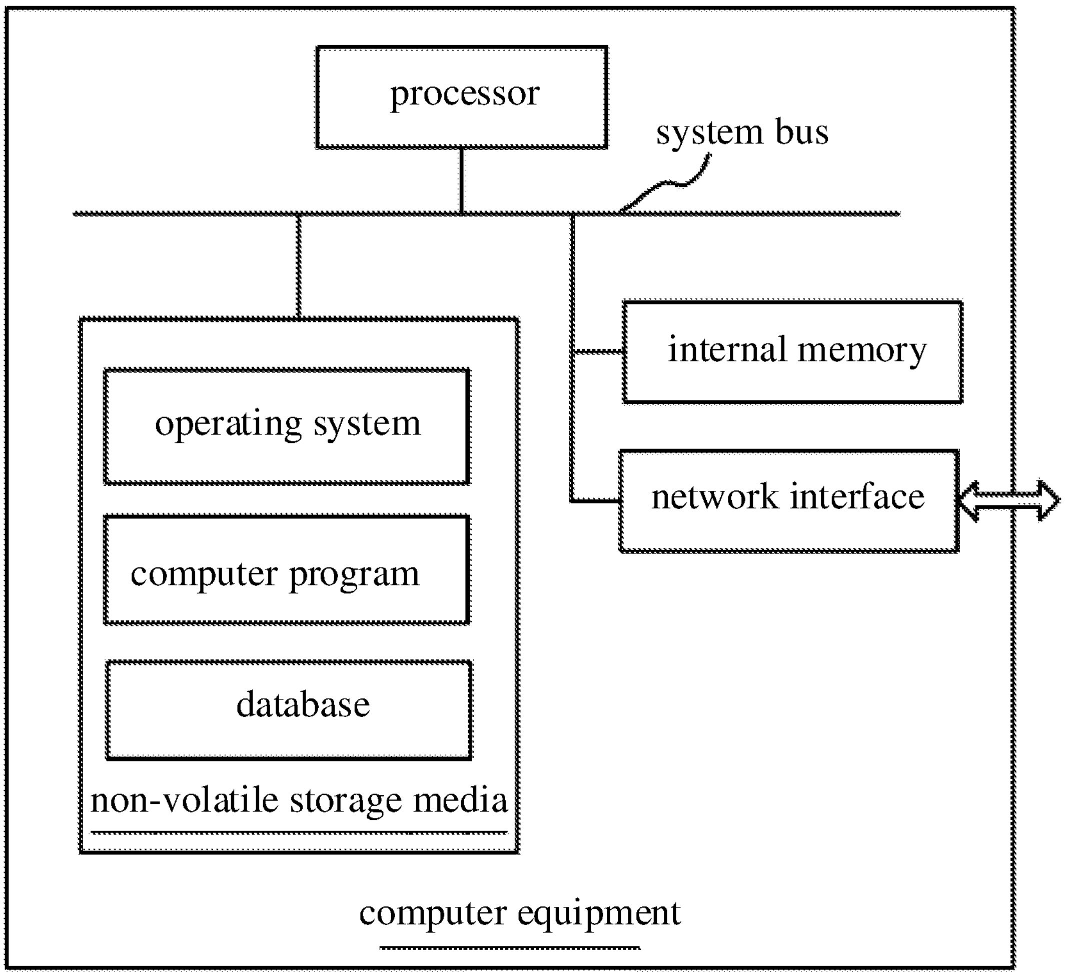
FIG. 11 is an internal structure diagram of a computer equipment according to some embodiments.

In some embodiments, a computer equipment is provided. The computer equipment may be a server or a terminal, and its internal structure diagram may be as shown in FIG. 11. The computer equipment includes a processor, a memory, and a network interface connected with each other through a system bus. The processor of the computer equipment is configured to calculate and control. The memory of the computer equipment includes a non-volatile storage media and an internal memory. The non-volatile storage medium stores an operating system, a computer program and a database. This internal memory provides an environment for the execution of the operating system and the computer program in the non-volatile storage media. The database of the computer equipment is configured to store image enhancement data. The network interface of the computer equipment is configured to communicate with external terminals through a network. When the computer program is executed by the processor, the image enhancement method is implemented.

Those skilled in the art can understand that the structure shown in FIG. 11 is only a block diagram of a partial structure related to the technical solution of the present application, and does not constitute a limitation on the computer equipment to which the technical solution of the present application is applied. The specific computer equipment can include more or fewer components than shown in the figures, or can combine certain parts, or have a different arrangement of components.

In some embodiments, a computer equipment is further provided, which includes a memory and a processor. A computer program is stored in the memory. When the processor executes the computer program, the image enhancement method as mentioned above is implemented.

In some embodiments, a computer-readable storage medium is provided, which stores a computer program. When the computer program is executed by a processor, the image enhancement method as mentioned above is implemented.

In some embodiments, a computer program is provided, which includes a program instruction. When executed on a computer equipment, the program instruction causes the computer equipment to implement the image enhancement method as mentioned above.

Those skilled in the art can understand that all or part of the processes in the methods of the above embodiments can be completed by a computer program instructing relevant hardware. The computer program can be stored in a non-volatile computer-readable storage media. When the computer program is executed, the computer program may include the processes of the processes in the methods of the above embodiments. Any of the memory, the storage, the database or other media used in the embodiments of the present application may include at least one of the non-volatile memory and the volatile memory. The non-volatile memory may include a read-only memory (ROM), a magnetic tape, a floppy disk, a flash memory or an optical memory, and the like. The volatile memory may include a random access memory (RAM) or an external cache memory. As an illustration and not a limitation, RAM can be in various forms, such as a static random access memory (SRAM) or a dynamic random access memory (DRAM), and the like.

The technical features of the above embodiments can be combined in any way. To simplify the description, not all possible combinations of the technical features in the above embodiments are described. However, as long as there is no contradiction in the combination of these technical features, all possible combinations should be within the scope of the present application.

The embodiments as mentioned above only express several implementation modes of the present application, and the descriptions are relatively specific and detailed, but they should not be considered as a limitation on the scope of the present application. It should be noted that, for those skilled in the art, several modifications and improvements can be made without departing from the concept of the present application, and these all fall within the scope of the present application. Therefore, the scope of the present application should be determined by the appended claims.

What is claimed is:

1. An image enhancement method, executed by a computer equipment, wherein the method comprises:

obtaining an image adjustment parameter, wherein the image adjustment parameter comprises a luminance adjustment parameter and a chroma adjustment parameter;

converting first image data to be processed into second image data, wherein the first image data and the second image data belong to different color dimensions, and the second image data comprises luminance data and chroma data;

adjusting the luminance data based on the luminance adjustment parameter to obtain adjusted luminance data, determining whether the adjusted luminance data meets a preset luminance enhancement condition, updating the luminance adjustment parameter in response to that the adjusted luminance data does not meet the preset luminance enhancement condition, and based on an updated luminance adjustment parameter, continuing to adjust the adjusted luminance data until final adjusted luminance data meets the luminance enhancement condition;

adjusting the chroma data based on the chroma adjustment parameter to obtain adjusted chroma data, determining whether the adjusted chroma data meets a preset chroma enhancement condition, updating the chroma adjustment parameter in response to that the adjusted chroma data does not meet the preset chroma enhancement condition, and based on an updated chroma adjustment parameter, continuing to adjust the adjusted chroma data until final adjusted chroma data meets the chroma enhancement condition; and performing image color dimension conversion on the luminance data that meets the luminance enhancement condition and the chroma data that meets the chroma enhancement condition, to obtain third image data belonging to a same color dimension as the first image data, thereby generating the third image data after image-enhanced from the first image data, wherein the adjusting the luminance data based on the luminance adjustment parameter to obtain the adjusted luminance data comprises:

making statistics on luminance data before adjustment based on the luminance adjustment parameter, and determining a scaling coefficient based on a statistical result and maximum required luminance of the luminance adjustment parameter, wherein the statistical result comprises a minimum luminance value, a maximum luminance value and an initial average luminance value of the luminance data before adjustment;

performing luminance linear scaling processing on the luminance data of the second image data to obtain luminance data after luminance linear scaling processing according to the scaling coefficient, and determining a scaling average luminance value based on the luminance data after luminance linear scaling processing;

determining at least one target interval to be performed luminance adjustment of the second image data according to the scaling average luminance value;

determining an adaptive luminance adjustment manner matching the second image data; and adjusting the luminance data in the at least one target interval to obtain the adjusted luminance data based on a matched adaptive luminance adjustment manner.

2. The method according to claim 1, wherein the determining at least one target interval to be performed luminance adjustment of the second image data according to the scaling average luminance value comprises:

dividing the luminance data after luminance linear scaling processing into a first luminance data set and a second luminance data set based on the scaling average luminance value;

filtering out a first target luminance value with a highest occurrence frequency from the first luminance data set, and filtering out a second target luminance value with a highest occurrence frequency from the second luminance data set; and determining a target interval corresponding to luminance data to be performed luminance adjustment according to frequency values respectively corresponding to the first target luminance value and the second target luminance value.

3. The method according to claim 2, wherein the determining the target interval corresponding to the luminance data to be performed luminance adjustment according to the frequency values respectively corresponding to the first target luminance value and the second target luminance value comprises:

determining a first luminance frequency of the first target luminance value in the first luminance data set;

determining a second luminance frequency of the second target luminance value in the second luminance data set;

obtaining a first luminance data adjustment interval based on the first luminance frequency, wherein the first target luminance value is within the first luminance data adjustment interval;

obtaining a second luminance data adjustment interval based on the second luminance frequency, wherein the second target luminance value is within the second luminance data adjustment interval; and using the first luminance data adjustment interval and the second luminance data adjustment interval as target intervals to be performed luminance adjustment of the second image data.

4. The method according to claim 3, wherein the obtaining the first luminance data adjustment interval based on the first luminance frequency comprises:

determining a luminance value corresponding to a middle frequency of a left side of a dark area and a luminance value corresponding to a middle frequency of a right side of the dark area according to the first luminance frequency, wherein the middle frequency of the dark area is half of the first luminance frequency; and determining a first luminance data adjustment area from the first luminance data set according to the luminance value corresponding to the middle frequency of the left side of the dark area and the luminance value corresponding to the middle frequency of the right side of the dark area.

5. The method according to claim 3, wherein the obtaining the second luminance data adjustment interval based on the second luminance frequency comprises:

determining a luminance value corresponding to a middle frequency of a left side of a bright area and a luminance value corresponding to a middle frequency of a right side of the bright area according to the second luminance frequency, wherein the middle frequency of the bright area is half of the second luminance frequency; and determining a second luminance data adjustment area from the second luminance data set according to the luminance value corresponding to the middle frequency of the left side of the bright area and the luminance value corresponding to the middle frequency of the right side of the bright area.

6. The method according to claim 2, wherein the luminance adjustment parameter comprises the maximum required luminance, and determining the adaptive luminance adjustment manner matching the second image data comprises:

multiplying the maximum required luminance by a first weight to obtain a first luminance threshold, and multiplying the maximum required luminance by a second weight to obtain a second luminance threshold, wherein the first weight is smaller than the second weight; and determining the adaptive luminance adjustment manner matching the second image data from a preset luminance adjustment manner according to the scaling average luminance value, the first target luminance value, the second target luminance value, the first luminance threshold and the second luminance threshold.

7. The method according to claim 6, wherein the adaptive luminance adjustment manner comprises a gamma adjustment formula corresponding to the luminance data, and the method further comprises:

calculating a normalized gamma value corresponding to each grayscale level based on a grayscale level of the first image data, and obtaining a gamma value mapping table corresponding to each grayscale level based the normalized gamma value corresponding to each grayscale level;

using the luminance data and a gamma coefficient as variables to perform a bilinear interpolation calculation to obtain a first interpolation coefficient based on a variable representation, and using a difference value between a value one and a first interpolation coefficient as a second interpolation coefficient;

mapping a luminance data variable to a grayscale space, determining a third interpolation coefficient based on a mapped luminance data variable, and using a difference value between the value one and the third interpolation coefficient as a fourth interpolation coefficient;

determining a gamma approximate adjustment coefficient corresponding to the luminance data based on the first interpolation coefficient, the second interpolation coefficient, the third interpolation coefficient, the fourth interpolation coefficient, and the gamma value mapping table corresponding to each grayscale level; and determining a gamma adjustment formula corresponding to the luminance data according to the gamma approximate adjustment coefficient and the maximum luminance.

8. The method according to claim 1, wherein the chroma adjustment parameter comprises a hue rotation angle, a saturation adjustment coefficient and a chroma compensation table, and the adjusting the chroma data based on the chroma adjustment parameter to obtain the adjusted chroma data comprises:

making statistics on luminance data before adjustment based on the luminance adjustment parameter, determining a scaling coefficient based on a statistical result and maximum required luminance of the luminance adjustment parameter, wherein the statistical result comprises a minimum luminance value, a maximum luminance value and an initial average luminance value of the luminance data before adjustment;

performing a two-dimensional rotation on the chroma data according to the hue rotation angle to obtain first chroma data;

converting the first chroma data according to the saturation adjustment coefficient and the scaling coefficient to obtain second chroma data; and performing a chroma compensation on the second chroma data to obtain third chroma data according to the chroma compensation table, and using the third chroma data as adjusted chroma data.

9. An image enhancement device, comprising:

an acquisition module configured to acquire an image adjustment parameter, wherein the image adjustment parameter comprises a luminance adjustment parameter and a chroma adjustment parameter;

a first conversion module, wherein the first conversion module is configured to convert first image data to second image data, wherein the first image data and the second image data belong to different color dimensions, and the second image data comprises luminance data and chroma data;

a first adjustment module, wherein the first adjustment module is configured to adjust the luminance data based on the luminance adjustment parameter to obtain adjusted luminance data, determine whether the adjusted luminance data meets a preset luminance enhancement condition, update the luminance adjustment parameter in response to that the adjusted luminance data does not meet the preset luminance enhancement condition, and continue to adjust the adjusted luminance data based on the updated luminance adjustment parameter until the final adjusted luminance data meets the luminance enhancement condition;

a second adjustment module, wherein the second adjustment module is configured to adjust the chroma data based on the chroma adjustment parameter to obtain adjusted chroma data, determine whether the adjusted chroma data meets a preset chroma enhancement condition, update the chroma adjustment parameter in response to that the adjusted chroma data does not meet the preset chroma enhancement condition, and continue to adjust the adjusted chroma data based on the updated chroma adjustment parameter until the final adjusted chroma data meets the chroma enhancement condition; and a second conversion module, wherein the second conversion module is configured to perform image color dimension conversion on the luminance data that meets the luminance enhancement condition and the chroma data that meets the chroma enhancement condition to obtain a third image data belonging to a same color dimension as the first image data, and use the third image data as a result of performing image enhancement processing on the first image data, wherein the first adjustment module is further configured to:

make statistics on luminance data before adjustment based on the luminance adjustment parameter, and determine a scaling coefficient based on a statistical result and maximum required luminance of the luminance adjustment parameter, wherein the statistical result comprises a minimum luminance value, a maximum luminance value and an initial average luminance value of the luminance data before adjustment;

perform luminance linear scaling processing on the luminance data of the second image data to obtain luminance data after luminance linear scaling processing according to the scaling coefficient, and determine a scaling average luminance value based on the luminance data after luminance linear scaling processing;

determine at least one target interval to be performed luminance adjustment of the second image data according to the scaling average luminance value;

determine an adaptive luminance adjustment manner matching the second image data; and adjust the luminance data in the at least one target interval to obtain the adjusted luminance data based on a matched adaptive luminance adjustment manner.

10. The device according to claim 9, wherein the first adjustment module is further configured to:

divide the luminance data after luminance linear scaling processing into a first luminance data set and a second luminance data set based on the scaling average luminance value;

filter out a first target luminance value with a highest occurrence frequency from the first luminance data set, and filter out a second target luminance value with a highest occurrence frequency from the second luminance data set; and determine a target interval corresponding to luminance data to be performed luminance adjustment according to frequency values respectively corresponding to the first target luminance value and the second target luminance value.

11. The device according to claim 10, wherein the first adjustment module is further configured to:

determine a first luminance frequency of the first target luminance value in the first luminance data set, and determine a second luminance frequency of the second target luminance value in the second luminance data set;

obtain a first luminance data adjustment interval based on the first luminance frequency, wherein the first target luminance value is within the first luminance data adjustment interval;

obtain a second luminance data adjustment interval based on the second luminance frequency, wherein the second target luminance value is within the second luminance data adjustment interval; and use the first luminance data adjustment interval and the second luminance data adjustment interval as target intervals to be performed luminance adjustment of the second image data.

12. The device according to claim 11, wherein the first adjustment module is further configured to:

determine a luminance value corresponding to a middle frequency of a left side of a dark area and a luminance value corresponding to a middle frequency of a right side of the dark area according to the first luminance frequency, wherein the middle frequency of the dark area is half of the first luminance frequency; and determine a first luminance data adjustment area from the first luminance data set according to the luminance value corresponding to the middle frequency of the left side of the dark area and the luminance value corresponding to the middle frequency of the right side of the dark area.

13. The device according to claim 11, wherein the first adjustment module is further configured to:

determine a luminance value corresponding to a middle frequency of a left side of a bright area and a luminance value corresponding to a middle frequency of a right side of the bright area according to the second luminance frequency, wherein the middle frequency of the bright area is half of the second luminance frequency; and determine a second luminance data adjustment area from the second luminance data set according to the luminance value corresponding to the middle frequency of the left side of the bright area and the luminance value corresponding to the middle frequency of the right side of the bright area.

14. The device according to claim 10, wherein the first adjustment module is further configured to:

multiply the maximum required luminance by a first weight to obtain a first luminance threshold, and multiply the maximum required luminance by a second weight to obtain a second luminance threshold, wherein the first weight is smaller than the second weight; and determine the adaptive luminance adjustment manner matching the second image data from a preset luminance adjustment manner according to the scaling average luminance value, the first target luminance value, the second target luminance value, the first luminance threshold and the second luminance threshold.

15. The device according to claim 14, wherein the adaptive luminance adjustment manner comprises a gamma adjustment formula corresponding to the luminance data, the device further comprises a mapping module, and the mapping module is configured to:

calculate a normalized gamma value corresponding to each grayscale level based on a grayscale level of the first image data, and obtain a gamma value mapping table corresponding to each grayscale level based the normalized gamma value corresponding to each grayscale level;

use the luminance data and a gamma coefficient as variables to perform a bilinear interpolation calculation to obtain a first interpolation coefficient based on a variable representation, and use a difference value between a value one and a first interpolation coefficient as a second interpolation coefficient;

map a luminance data variable to a grayscale space, determine a third interpolation coefficient based on a mapped luminance data variable, and use a difference value between the value one and the third interpolation coefficient as a fourth interpolation coefficient;

determine a gamma approximate adjustment coefficient corresponding to the luminance data based on the first interpolation coefficient, the second interpolation coefficient, the third interpolation coefficient, the fourth interpolation coefficient, and the gamma value mapping table corresponding to each grayscale level; and determine a gamma adjustment formula corresponding to the luminance data according to the gamma approximate adjustment coefficient and the maximum luminance.

16. The device according to claim 9, wherein the chroma adjustment parameter comprises a hue rotation angle, a saturation adjustment coefficient and a chroma compensation table, and the second adjustment module is further configured to:

make statistics on luminance data before adjustment based on the luminance adjustment parameter, determine a scaling coefficient based on a statistical result and maximum required luminance of the luminance adjustment parameter, wherein the statistical result comprises a minimum luminance value, a maximum luminance value and an initial average luminance value of the luminance data before adjustment;

perform a two-dimensional rotation on the chroma data according to the hue rotation angle to obtain first chroma data;

convert the first chroma data according to the saturation adjustment coefficient and the scaling coefficient to obtain second chroma data; and perform a chroma compensation on the second chroma data to obtain third chroma data according to the chroma compensation table, and use the third chroma data as adjusted chroma data.

17. A non-transitory storage medium having stored thereon computer-readable instructions that, when executed on a computer equipment, cause the computer equipment to implement the method according to claim 1.

* * * * *